United States Patent
Lee

(10) Patent No.: US 9,733,787 B2
(45) Date of Patent: Aug. 15, 2017

(54) MOBILE TERMINAL AND CONTROL METHOD FOR THE SAME

(71) Applicant: LG ELECTRONICS INC., Seoul (KR)

(72) Inventor: Gunho Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 300 days.

(21) Appl. No.: 14/593,309

(22) Filed: Jan. 9, 2015

(65) Prior Publication Data

US 2015/0205451 A1    Jul. 23, 2015

(30) Foreign Application Priority Data

Jan. 23, 2014    (KR) .................. 10-2014-0008462

(51) Int. Cl.
| | | |
|---|---|---|
| G06F 3/00 | (2006.01) | |
| G06F 3/0481 | (2013.01) | |
| G06F 3/01 | (2006.01) | |
| G06F 3/0488 | (2013.01) | |
| G06F 3/0486 | (2013.01) | |

(52) U.S. Cl.
CPC ............ G06F 3/0481 (2013.01); G06F 3/013 (2013.01); G06F 3/017 (2013.01); G06F 3/0486 (2013.01); G06F 3/04883 (2013.01)

(58) Field of Classification Search
CPC ............. G06F 3/0482; G06F 17/30716; G06F 17/3053; G06F 3/0481; G02B 27/01; G02B 27/0172

USPC ......... 715/745, 761, 767; 707/706; 359/630; 345/156

See application file for complete search history.

(56) References Cited

U.S. PATENT DOCUMENTS

| | | | | |
|---|---|---|---|---|
| 2004/0080532 | A1* | 4/2004 | Cragun ............. | G06F 17/30716 715/745 |
| 2009/0254855 | A1 | 10/2009 | Kretz et al. | |
| 2009/0298547 | A1* | 12/2009 | Kim ........................ | G06F 1/162 455/566 |
| 2013/0104065 | A1* | 4/2013 | Stecher ................. | G06F 3/0481 715/767 |
| 2014/0201653 | A1* | 7/2014 | Han ....................... | G06F 3/0482 715/761 |

(Continued)

OTHER PUBLICATIONS

European Search Report for Application 15150735.7 dated Apr. 9, 2015.

*Primary Examiner* — Haoshian Shih
(74) *Attorney, Agent, or Firm* — KED & Associates LLP

(57) ABSTRACT

The present invention relates to a transparent display or a mobile terminal which allows images of objects positioned on the rear of the mobile terminal to be displayed on a display unit like the transparent display does and a control method for the same. The mobile terminal includes: a main body having a front portion and a rear portion; a transparent display unit located on the front of the main body and allowing images of objects positioned on the rear of the main body to be at least partially transmitted through; and a controller that, when at least one region of the transparent display unit is selected, controls the transparent display unit to make the image data displayed in the region overlap a semi-transmissive area corresponding to the one region.

18 Claims, 15 Drawing Sheets

(56) References Cited

U.S. PATENT DOCUMENTS

2014/0293433 A1* 10/2014 Hashimoto ............ G02B 27/01
    359/630
2014/0320399 A1* 10/2014 Kim ................... G02B 27/0172
    345/156
2015/0100562 A1* 4/2015 Kohlmeier .......... G06F 17/3053
    707/706

* cited by examiner

MOBILE TERMINAL AND CONTROL METHOD FOR THE SAME

CROSS-REFERENCE TO RELATED APPLICATION

Pursuant to 35 U.S.C. §119(a), this application claims the benefit of earlier filing date and right of priority to Korean Application No. 10-2014-0008462, filed on Jan. 23, 2014, the contents of which is incorporated by reference herein in its entirety.

BACKGROUND OF THE INVENTION

1. Field of the Invention

The present invention relates to a transparent display or a mobile terminal which allows images of objects positioned on the rear of the mobile terminal to be displayed on a display unit like the transparent display does and a control method for the same.

2. Description of the Conventional Art

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software.

Current mobile terminals, often treated as a fashion accessory, have evolved toward something more sophisticated and creative in design. For example, a current mobile terminal may be equipped with a transparent display which allows an image of an object positioned on the rear of the mobile terminal to be transmitted on the front of the mobile terminal.

Alternatively, using a camera, images of objects positioned on the rear of the mobile terminal can be output on a display unit, even without a transparent display, as if the mobile terminal is equipped with the transparent display.

Active research on the effective use of a mobile terminal equipped with a transparent display or capable of performing a similar function as the transparent display is currently underway.

SUMMARY OF THE INVENTION

Therefore, the present invention has been made in an effort to meet the above-described requirement, and an aspect of the present invention is to provide a mobile terminal which is capable of maintaining readability regardless of object images that are transmitted on the rear of the mobile terminal, and a control method therefor.

Another aspect of the present invention is to provide a mobile terminal which allows an object image to be transmitted on the rear face and displays image on a display unit more easily and clearly, and a control method therefor.

According to one embodiment of the present invention, there is provided a mobile terminal including: a main body having a front portion and a rear portion; a transparent display unit located on the front of the main body and allowing images of objects positioned on the rear of the main body to be at least partially transmitted through; and a controller that, when at least one region of the transparent display unit is selected, controls the transparent display unit to make the image data displayed in the region overlap a semi-transmissive 7 area corresponding to the one region.

The controller selects at least one region based on the size or resolution of text or image contained in the image data displayed on the transparent display unit.

The controller selects at least one region based on the user's touch and slide gesture on the transparent display unit.

The mobile terminal further includes a gaze detector for detecting the user's gaze, and the controller selects at least one region based on the direction of detected user's gaze.

The gaze detector further senses the movement of the user's gaze, and if the user's gaze moves, the controller controls the transparent display unit based on the direction the user's gaze moves to make image data displayed in a region other than the current selected region overlap the semi-transmissive area.

The controller controls the transparent display unit based on the user's touch and drag input to make the image data displayed in a region other than the current selected region overlap the semi-transmissive area.

The controller sets the color of the semi-transmissive area to a color contrasting with the color of at least one of text pieces and images contained in the image data displayed in the at least one region.

The mobile terminal further includes a camera or at least one color sensor for sensing colors on the rear of the main body, and the controller senses the color of at least one of the objects positioned on the rear of the main body by using the camera or at least one color sensor and determines the color of the semi-transmissive area based on the sensed color.

The mobile terminal further includes a camera or at least one color sensor for sensing colors on the rear of the main body, and the controller senses images of at least one of the objects positioned on the rear of the main body multiple times according to a predetermined condition, compares the detected images of the objects with each other, and if the amount of change made to the images is equal to or greater than a predetermined amount, resets at least one of the color and transparency of the semi-transmissive area.

The controller displays a graphics object associated with the adjustment of the transparency of the semi-transmissive area in at least some region of the transparent display unit based on the user's selection and determines the transparency of the semi-transmissive area based on the user's input applied on the graphics object.

According to another embodiment of the present invention, there is provided a mobile terminal including: a main body having a front portion and a rear portion; a camera located on the rear of the main body and receiving images of objects positioned on the rear of the main body; a display unit located on the front of the main body and displaying image data on the background of an image received by the camera; and a controller that, when at least one region of the display unit is selected, controls the transparent display unit to make the image data displayed in the region overlap a semi-transmissive area corresponding to the one region.

The controller selects at least one region based on the size or resolution of text or image contained in the image data displayed on the display unit.

The controller selects at least one region based on the user's touch and slide gesture on the display unit.

The mobile terminal further includes a gaze detector for detecting the user's gaze, and the controller selects at least one region based on the direction of detected user's gaze.

The gaze detector further senses the movement of the user's gaze, and if the user's gaze moves, the controller controls the transparent display unit based on the direction the user's gaze moves to make image data displayed in a region other than the current selected region overlap the semi-transmissive area.

The controller controls the display unit based on the user's touch and drag input to make the image data displayed in a region other than the current selected region overlap the semi-transmissive area.

The controller sets the color of the semi-transmissive area to a color contrasting with the color of at least one of text pieces and images contained in the image data displayed in the at least one region.

The mobile terminal further includes at least one color sensor for sensing colors on the rear of the main body, and the controller senses the color of at least one of the objects positioned on the rear of the main body by using the at least one color sensor and determines the color of the semi-transmissive area based on the sensed color.

The mobile terminal further includes a camera or at least one color sensor for sensing colors on the rear of the main body, and the controller senses images of at least one of the objects positioned on the rear of the main body multiple times according to a predetermined condition, compares the detected images of the objects with each other, and if the amount of change made to the images is equal to or greater than a predetermined amount, resets at least one of the color and transparency of the semi-transmissive area.

The controller displays a graphics object associated with changes in the color of the semi-transmissive area in at least some region of the transparent display unit based on the user's selection and determines the transparency of the semi-transmissive area based on the user's input applied on the graphics object.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
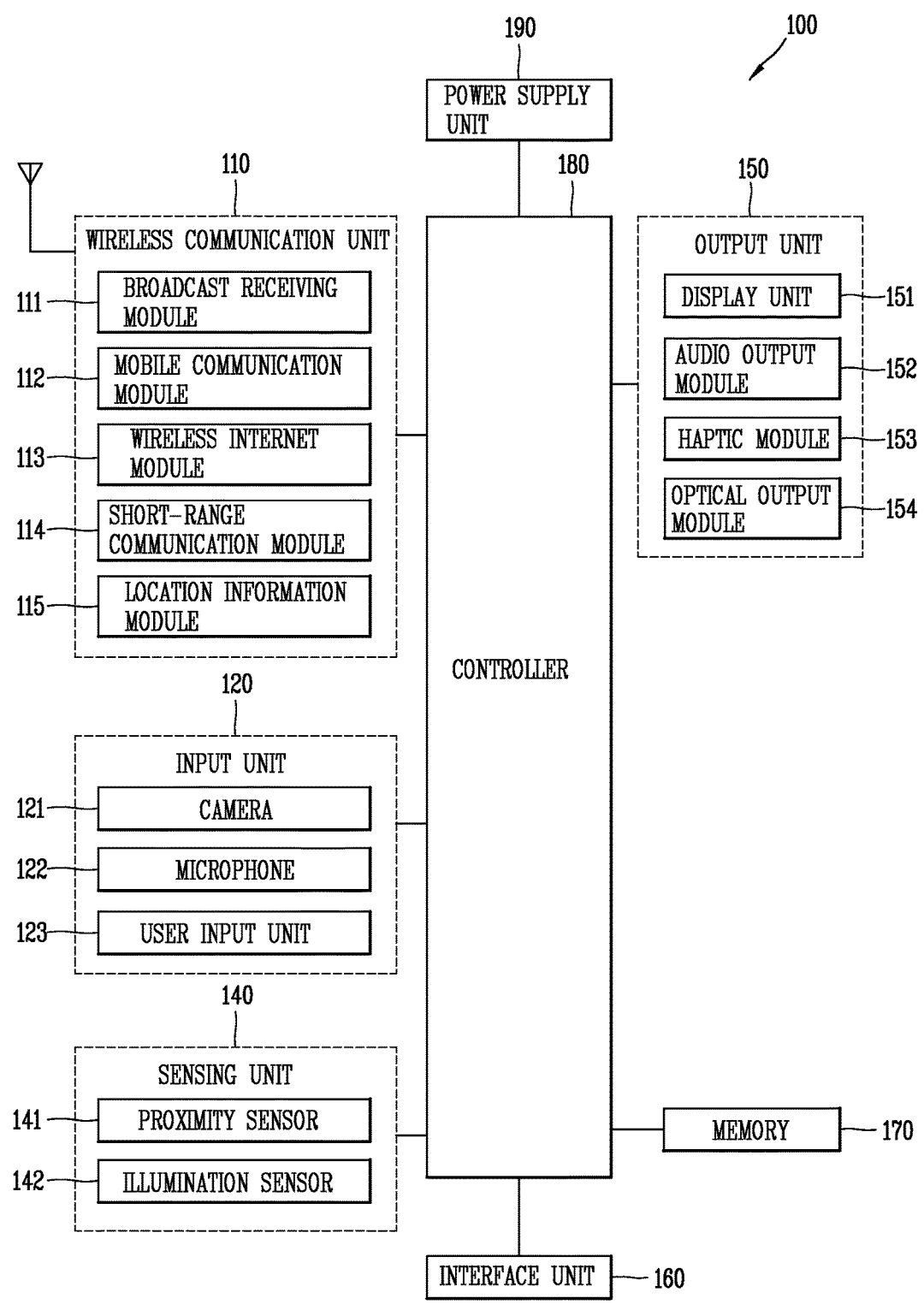
FIG. 1A is a block diagram showing a mobile terminal according to an embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Hereinafter, embodiments disclosed in this specification will be described in detail with reference to the attached drawings. In the following description, it is to be noted that the term 'semi-transmissive area' as used herein refers to an area where an image of an object positioned on the rear of a mobile terminal having a transparent display or capable of performing a transparent display function is kept from being transmitted. The transparency of the semi-transmissive area may be adjusted according user's control. Also, the color of the semi-transmissive area may be determined based on at least one of the following: a set color, the color of image data containing text and images displayed in the semi-transmissive area, and the color of an object positioned on the rear of the mobile terminal. It is needless to say that the color of the semi-transmissive area may be determined by the user's selection.

For a mobile terminal having a transparent display, the semi-transmissive area may be created by varying transparency which allows light to pass through. Alternatively, for a mobile terminal that makes images of objects positioned on the rear of the main body as background images overlap image data by outputting the images of the objects positioned on the rear of the main body on a first layer on a display unit and the image data on a second layer on the display unit, the semi-transmissive area may be created in a certain display region of the image data by outputting an image set to ensure readability between the first and the second layers.

Hence, for a mobile terminal that performs a similar function as the mobile terminal having a transparent display by using a camera, the term 'semi-transmissive area' to be used in the following description may refer to an area where an image set for readability is output between a first layer for outputting images of objects and a second layer for displaying image data. Therefore, the color of the semi-transmissive area may be the color of the image set for readability, and the transparency of the semi-transmissive area may refer to the transparency of the image set for readability.

For a mobile terminal having a transparent display, the term 'semi-transmissive area' may refer to at least some area where the transmittance of light passing through the transparent display varies for readability according to the present invention.

Figure 1B:
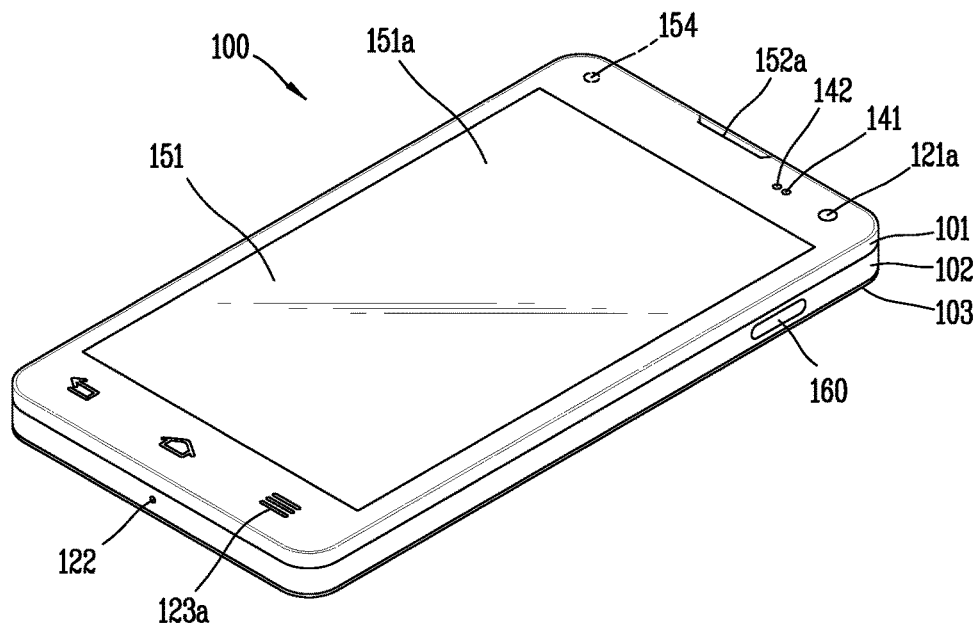
FIGS. 1B, 1C, and 1D are perspective views of the mobile terminal according to the embodiment of the present invention.
Figure 1C:
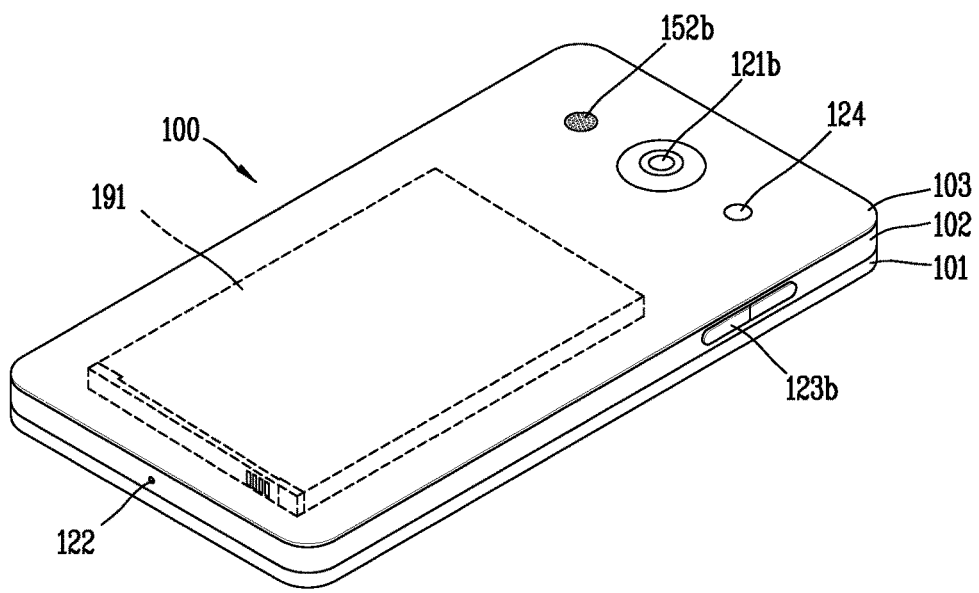

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The display unit 151, the first audio output module 152*a*, the second audio output module 152*b*, the proximity sensor 141, the illumination sensor 142, the optical output module 154, a first camera 121*a*, a second camera 121*b*, the first manipulation unit 123*a*, the second manipulation unit 123*b*, the microphone 122, the interface 160, etc. may be provided at the mobile terminal 100.

As shown in FIGS. 1B and 1C, the display unit 151, the first audio output module 152*a*, the proximity sensor 141, the illumination sensor 142, the optical output module 154, the first camera 121*a* and the first manipulation unit 123*a* are arranged on a front surface of the terminal body. The second manipulation unit 123*b*, the microphone 122 and the interface 160 are arranged on side surfaces of the terminal body. And the second audio output module 152*b* and the second camera 121*b* are arranged on a rear surface of the terminal body.

However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

Some of these displays may be configured as transparent or light-transmissive displays through which the user may see the outside. These displays may be called as transparent displays. A representative example of the transparent displays may be a transparent OLED (TOLED), and the like. The rear structure of the display unit 151 may also be configured as a light-transmissive structure. Through such a structure, the user can see an object positioned on the rear of the body of the terminal through a region occupied by the display unit 151.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a receiver, and the second audio output module 152*b* may be implemented in the form of a loud speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may be implemented in a user's non-tactile manner, e.g., by a proximity touch, a hovering touch, etc.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

As shown in FIGS. 1B and 1C, the controller 180 may receive images of objects positioned on the rear of the terminal body through the camera 121b provided on the rear of the mobile terminal 100, and output the received images to the display unit 151. The controller 180 may allow various image data to be output on the background of an image output on the display unit 151.

Figure 1D:
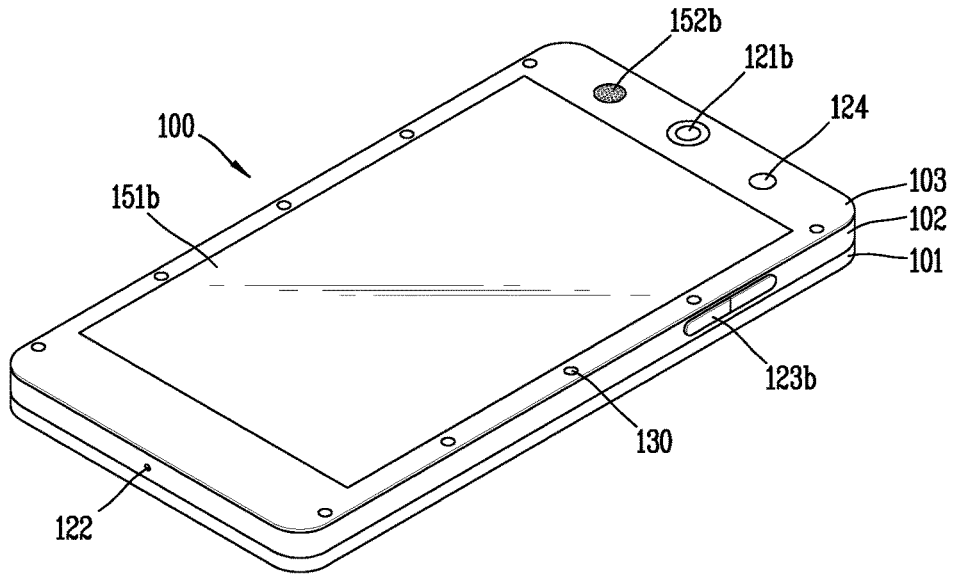

On the contrary, the display unit 151 may be configured as a transparent or light-transmissive display through which the user may see the outside. In this case, as shown in FIG. 1D, the mobile terminal 100 according to the embodiment of the present invention may have a structure in which the user can see an object positioned on the rear of the body of the terminal 100 through a region occupied by the display unit 151b of the body of the terminal 100.

However, when an image of an object positioned on the rear of the mobile terminal 100 is transmitted on the display unit 151 on the front of the mobile terminal 100, image data output on the display unit 151 and the transmitted image of the object may overlap, or the readability of the image data may be severely degraded if the transmitted color of the object is similar to that of the image data.

To prevent degradation of the readability of image data, when at least one region of the display unit 151 is selected, the controller 180 of the mobile terminal 100 according to the embodiment of the present invention may allow image data displayed in the at least one selected region to be displayed in such a manner as to overlap a semi-transmissive area corresponding to the size and position of the selected region. Accordingly, the image data displayed in at least one region of the display unit 151 may maintain some readability regardless of the transmitted image of the object.

To further improve the readability of image data, the controller 180 may change the color of the semi-transmissive area based on at least either the image data displayed on the display unit 151 or the objects on the rear of the mobile terminal 100. For example, the controller 180 may recognize the color of the objects positioned on the rear of the mobile terminal using the camera provided on the rear of the mobile terminal 100 or at least one color sensor 130, and change the color of the semi-transmissive area to a color different from the color of the objects, more preferably, a color contrasting with the color of the objects.

As described above, the color sensor 130 is for sensing the color of the objects positioned on the rear of the mobile terminal 100. The color sensor 130 may be a small camera with a low resolution, which is different from the cameras 121 because even the low resolution is enough to recognize colors. A plurality of such color sensors may be provided on the rear of the mobile terminal 100, as shown in FIGS. 1C and 1D, and the controller 180 may determine the color of the semi-transmissive area based on the number and positions of the color sensors.

For example, if there are a plurality of color sensors 130, the controller 180 may calculate the average color from the color values (e.g., RGB values) sensed by the color sensors, respectively. Then, the controller 180 may set the color of the background to a color different from the calculated average color or a color contrasting with the average color. Alternatively, the controller 180 may divide the display unit 151 into a plurality of regions based on the positions of the color sensors to correspond to the positions of the color sensors, respectively, and determine the color of the semi-transmissive area using the values of the color sensors corresponding to the respective regions. In this case, the semi-transmissive area of different colors may be output to the at least one selected region of the display unit based on the regions of the display unit respectively corresponding to the color sensors.

Hereinafter, embodiments related to a control method for the thus-configured mobile terminal 100 will be discussed with reference to the accompanying drawings.

Figure 2:
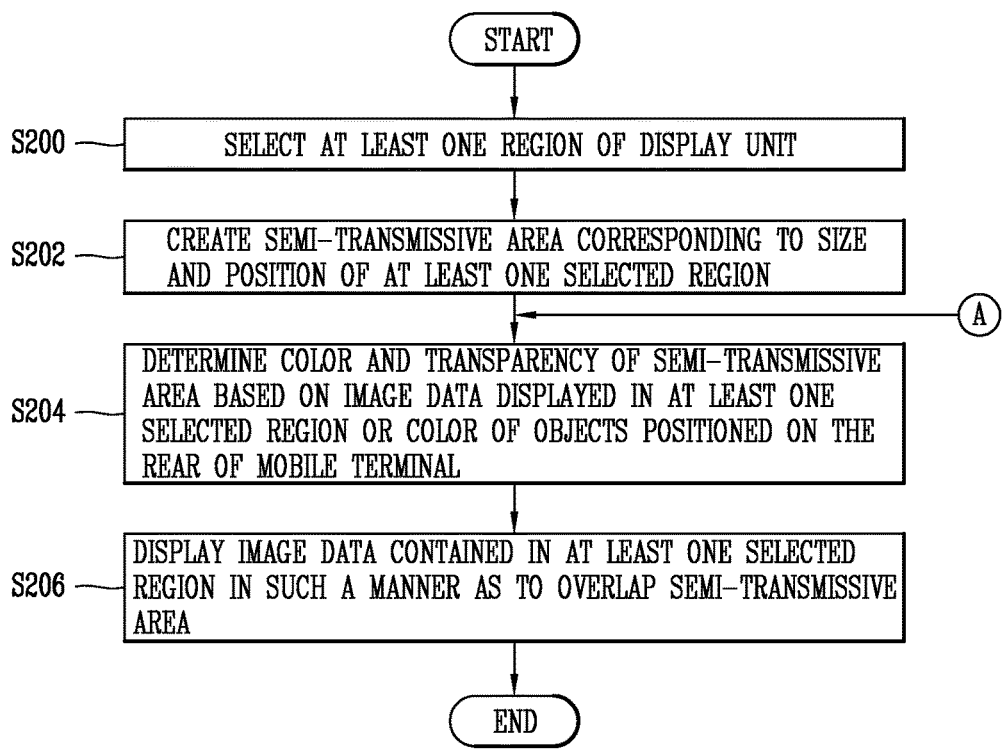
FIG. 2 is a conceptual diagram illustrating the flow of a process for displaying image data in such a manner as to overlap a predetermined semi-transmissive area in the mobile terminal according to the embodiment of the present invention.

FIG. 2 is a conceptual diagram illustrating the flow of a process for displaying image data in such a manner as to overlap a predetermined semi-transmissive area in the mobile terminal according to the embodiment of the present invention.

First of all, referring to FIG. 2, the controller 180 of the mobile terminal 100 according to the embodiment of the present invention may select at least one region of the display unit 151 (S200). Here, the controller 180 may select one region of the display unit 151 which is to be displayed in such a manner as to overlap a semi-transmissive area, based on the user's selection or according to a predetermined condition. For example, the controller 180 may select a display region of text with a size equal to or less than a predetermined size or a display region of an image with a resolution equal to or less than a predetermined resolution, based on the size or resolution of text or image displayed on the display unit 151. Alternatively, upon sensing a predetermined user gesture, the controller 180 may select the region corresponding to the user gesture.

The controller 180 may select the at least one region depending on the type of image data displayed on the display unit 151. For example, if multiple messages are displayed on the display unit 151 in a chat format, the controller 180 may select a region displaying only one of the multiple messages based on the user's selection. Alternatively, the controller 180 may select a region (e.g., multiple text strings) containing multiple pieces of text or multiple images displayed on the display unit 151.

Next, the controller 180 may create a semi-transmissive area corresponding to the size and position of the region selected in the step S200 (S202). The controller 180 may then determine the color and transparency of the semi-transmissive area created in the step S202 (S204). Here, the semi-transmissive area may be an area which is rendered opaque according to a predetermined color and a predetermined transparency. For example, if the display unit 151 is a transparent type, the controller 180 may adjust the transparency of the display unit 151 to make only a display region of the semi-transmissive area opaque.

On the other hand, the controller 180 may select the color of the background as the color of the semi-transmissive area. Also, the controller 180 may determine the color of the semi-transmissive area based on image data displayed in the selected region. Here, the controller 180 may set the color of the semi-transmissive area to a color that enhances the readability of the image data as much as possible. For example, the controller 180 may calculate the average color from the colors of the image data, and set the color of the semi-transmissive area to a color contrasting with the calculated average color.

Moreover, the controller 180 may sense the color of objects positioned on the rear of the mobile terminal 100 by using the camera 121 or at least one color sensor 130, and determine the color of the semi-transmissive area based on the sensed color. Here, the controller 180 may set the color of the semi-transmissive area to a color that enhances the readability of the image data as much as possible. That is, the controller 180 may obtain the average color of the colors sensed by the camera 121 or at least one color sensor 130, and set the color of the semi-transmissive area to a color contrasting with the obtained average color.

Needless to say, the controller 180 may actuate the camera 121 or a plurality of color sensors 130 only when necessary. For example, once the color of objects positioned on the rear of the mobile terminal 100 is recognized, the controller 180 may sense a shift in the location of the mobile terminal 100 or a change in the color of the object images transmitted on the display unit 151 if the amount of the change is greater than a predetermined amount. Also, the controller 180 may refresh the color of the objects positioned on the rear of the mobile terminal 100 through the camera 121 or the plurality of color sensors 130 according to the sensing result.

Needless to say, the controller 180 may determine the color of the semi-transmissive area by taking into account the color of image data displayed in the at least one selected region and the colors sensed by the camera 121 or at least one color sensor 130.

Once the color of the semi-transmissive area is determined, the controller 180 displays the created semi-transmissive area in the at least one selected region. Then, the controller 180 displays the image data contained in the at least one selected region in such a manner as to overlap the displayed semi-transmissive area (S206). Accordingly, the mobile terminal 100 according to the embodiment of the present invention may allow the readability of image data contained in at least one region of the display unit 151 selected according to the user's selection or a predetermined condition to be maintained at a predetermined level or higher, regardless of images of the objects positioned on the rear of the mobile terminal 100.

Figure 3A:
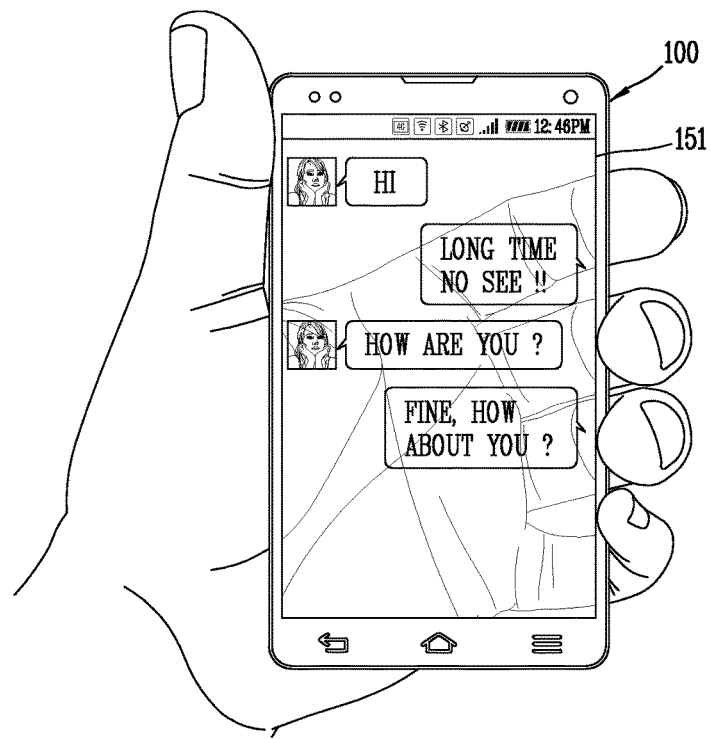
FIG. 3A, 3B are conceptual diagram illustrating examples where image data overlaps semi-transmissive area displayed in some region of the display unit according to the process shown in FIG. 2.
Figure 3B:
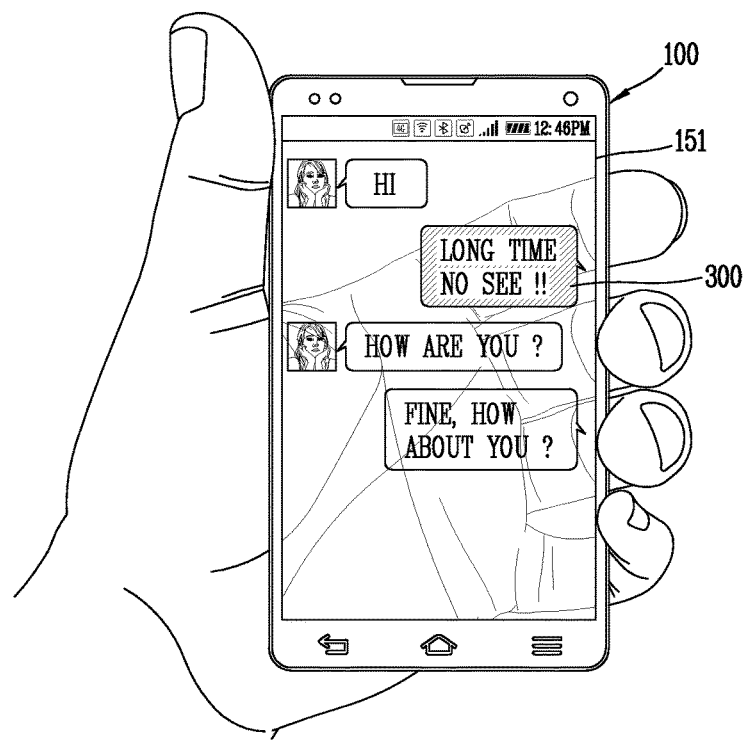

FIG. 3A, FIG. 3B illustrate examples where image data overlaps semi-transmissive area displayed in some region of the display unit according to the process shown in FIG. 2.

For example, in the mobile terminal 100 according to the embodiment of the present invention, the display unit 151 may be configured as a transparent type, or images received through the cameras 121 provided on the rear of the mobile terminal 100 may be displayed as the background on the display unit 151. Hence, as shown in FIG. 3A, the objects (e.g., the user's hand) positioned on the rear of the mobile terminal 100 may be displayed together with image data.

Hereupon, the controller 180 may select at least one region of the display unit 151 to overlap the semi-transmissive area according to the user's selection or a predetermined condition in the step S200. For example, upon detecting the user's touch input, the controller 180 may select some region of the display unit 151 that corresponds to the touch input detection point.

FIG. 3B shows such an example.

For example, while multiple messages are displayed on the display unit 151 as shown in FIG. 3A, the user may select one particular message. For instance, the user may select a region displaying only one of the multiple message by directly touching a display region of one particular message.

In this case, the controller 180 may create a semi-transmissive area corresponding to the selected region (S202), and determine the color of the created semi-transmissive area (S204). Here, the color of the semi-transmissive area may be determined based on at least either the color of image data displayed in the selected region or the color of an object positioned on the rear of the mobile terminal 100. The semi-transmissive area may be an opaque screen of the determined color. The controller 180 displays the image data displayed in the selected region in such a manner as to overlap the created semi-transmissive area.

Accordingly, as shown in FIG. 3B, the image data may be displayed on the opaque background screen of a different color from the color of the image data or the color of the object, i.e., the user's hand, positioned on the rear of the mobile terminal, in the region selected by the user. Therefore, the user can see the image data for the selected region more easily and conveniently.

While FIG. 3A, 3B have been illustrated by taking examples in which the user selects a particular region by themselves, it should be noted that at least one region of the display unit 151 can be selected according to a predetermined condition without the user's selection.

Figure 4A:
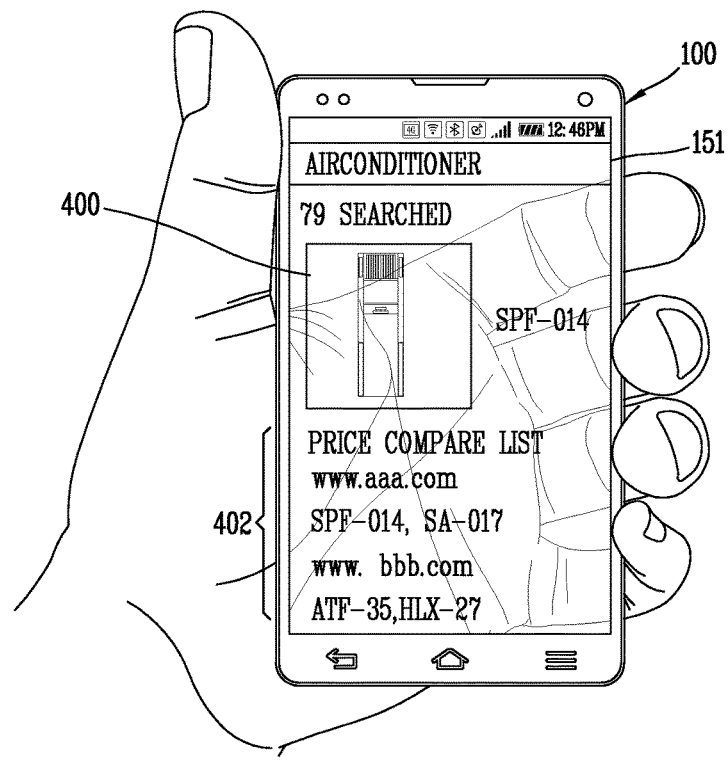
FIG. 4A, 4B are conceptual diagram illustrating examples where display regions of the semi-transmissive area are selected based on image data in the mobile terminal according to the embodiment of the present invention.
Figure 4B:
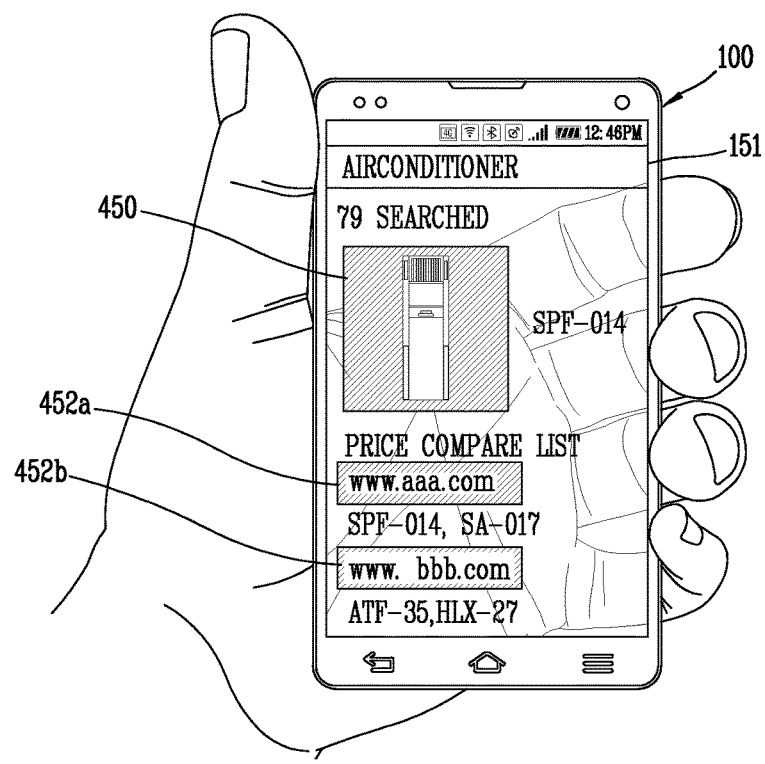

FIG. 4A, 4B illustrate examples where display regions of the semi-transmissive area are selected based on image data in the mobile terminal according to the embodiment of the present invention.

For example, in the mobile terminal 100 according to the embodiment of the present invention, if text or an image is displayed on the display unit 151, at least one region of the display unit 151 may be selected to overlap a semi-transmissive area based on the displayed text or image. In an example, if image data containing text or an image recognizable as text is displayed on the display unit 151, the controller 180 may select a display region of the text or the image recognizable as text based on the size of the text or the image recognizable as text. Moreover, if multiple images are output on the display unit 151, the controller 180 may select a display region of at least part of the multiple images based on the resolutions of the multiple images.

This will be discussed with reference to FIG. 4A which shows webpage search results. If an image or text is displayed on the display unit as shown in FIG. 4A, the controller 180 may select at least one region of the display unit 151 based on the size or resolution of the image or text. That is, the controller 180 may check the size or resolution of an image or text of image data displayed on the display unit 151 and select a region of the display unit 151 where the image or text is displayed.

For example, if an image 400 displayed on the display unit 151 has a resolution equal to or less than a predetermined resolution, the controller 180 may select a display region of the image 400 without the user's selection. Then, the controller 180 may select the selected region to overlap a semi-transmissive area. In this case, the controller 180 creates a semi-transmissive area corresponding to the size and position of the selected region, i.e., display region of the image 400 on the display unit 151. Then, as shown in FIG. 4B, the controller 180 may display the image 400 on the display unit 151 in such a manner as to overlap the semi-transmissive area 450 of a different color from the color of the image 400 or the color of the object, i.e., the user's hand, positioned on the rear of the mobile terminal 100.

If parts of the text displayed on the display unit 151 have a size equal to or less than a predetermined size, the controller 180 may select a display region of the text parts to overlap the semi-transmissive area without the user's selection. For example, assuming that text 402 is displayed on the display unit 151 as shown in FIG. 4A and parts of the text have a size equal to or less than a predetermined size, the controller 180 may create semi-transmissive areas 452a and 452b corresponding to the sizes and positions of display regions of the text parts with a size equal to or less than the predetermined size. Here, at least two semi-transmissive areas 452a and 452b may be created conforming to the display regions of the text parts.

When at least one semi-transmissive area is created, the controller 180 determines the color of the created semi-transmissive area. Here, the color of the semi-transmissive area may be different from the color of text parts with a size equal to or less than the predetermined size or the color of the object positioned on the rear of the mobile terminal 100. Then, as shown in FIG. 4B, the controller 180 outputs the semi-transmissive areas 452a and 452b in display regions of the text parts with a size equal to or less than the predetermined size, and displays the text parts on the display unit 151 in such a manner as to overlap the semi-transmissive areas. Accordingly, in the mobile terminal according to the embodiment of the present invention, at least one region of the display unit that displays image data corresponding to a predetermined condition may be selected based on the predetermined condition, even if the user does not select it.

Although the above description of FIG. 4A, 4B have been made taking an example in which the size or resolution of text or image displayed on the display unit 151 is used as the predetermined condition, the present invention is not limited to this example. For example, the predetermined condition may be a specific color or a given luminance level. That is, if the predetermined condition is a specific color, the controller 180 may select the display region of a part of the text or image to overlap the semi-transmissive area, depending on whether the color of the part of the text or image displayed on the display unit 151 is similar to the color corresponding to the predetermined condition to some degree or more. Alternatively, if the predetermined condition is a given luminance level, the controller 180 may compare the surrounding brightness sensed by an illumination sensor with the luminance of the image data displayed on the display unit 151, and select a display region of image data with a predetermined luminance level or higher to overlap the semi-transmissive area if the surrounding brightness of the mobile terminal 100 is equal to or greater than a given level.

Alternatively, the predetermined condition may be a kind of text string. In this case, it is needless to say that, if a predetermined text string, among the image data displayed on the display unit 151, is displayed in a region of the display unit 151, the controller 180 may select the region to overlap the semi-transmissive area.

Although the above description has been made taking an example in which one region of the display unit 151 is selected to overlap the semi-transmissive area without the user's selection, it should be noted that the user may select a region containing at least one piece of text or image by themselves. For example, the user may select a region containing at least one piece of text or image by themselves by means of a predetermined touch and slide gesture.

Figure 5A:
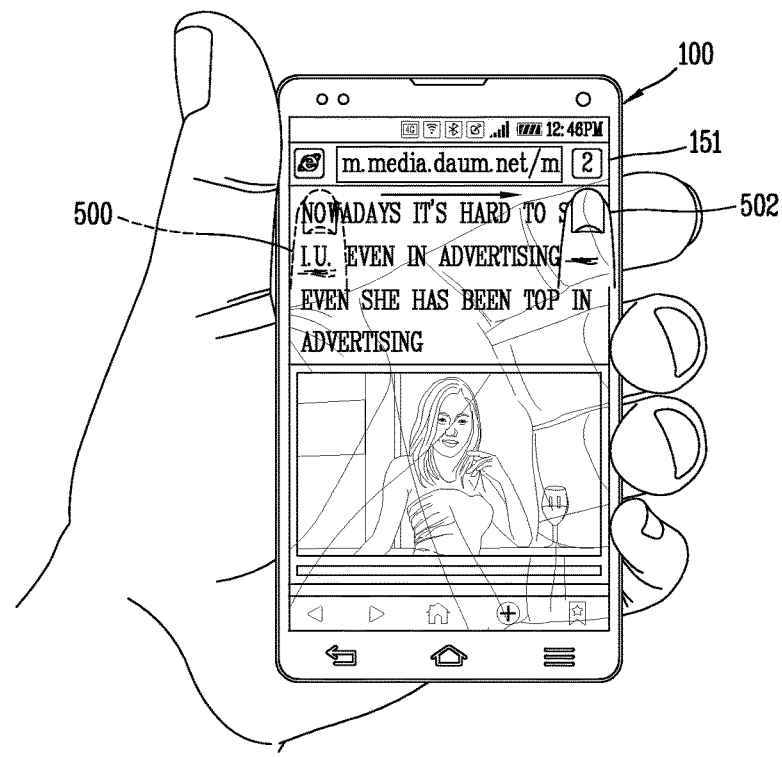
FIG. 5A, 5B are conceptual diagram illustrating examples where display regions of the semi-transmissive area are selected based on the user's selection in the mobile terminal according to the embodiment of the present invention.
Figure 5B:
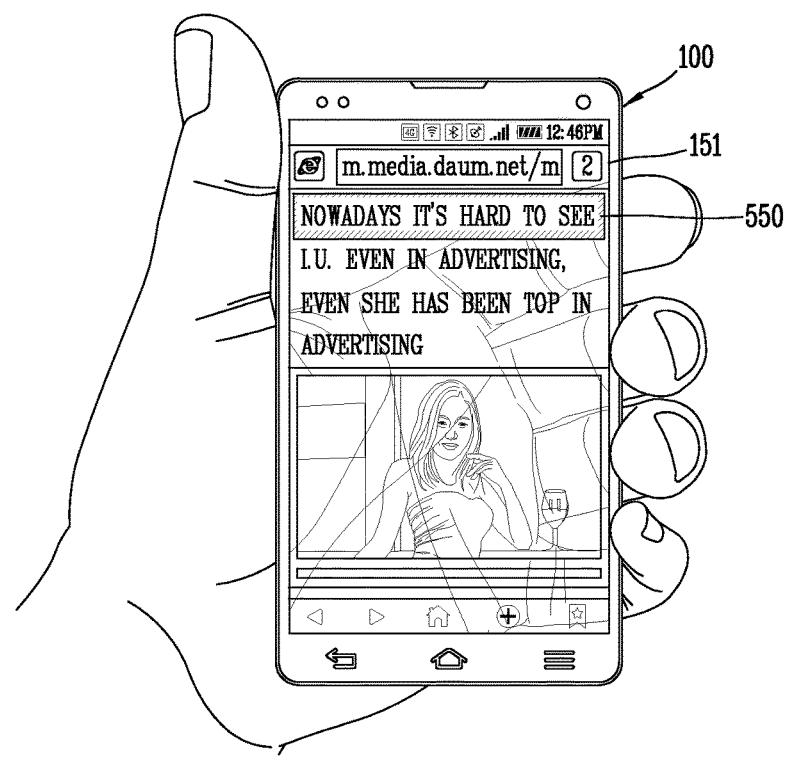

FIG. 5A, 5B illustrate examples where display regions of the semi-transmissive area are selected based on the user's selection in the mobile terminal according to the embodiment of the present invention.

As shown in FIG. 5A, while multiple pieces of text are output on the display unit 151, the user may select a region to overlap a semi-transmissive area by themselves by means of a predetermined touch gesture. For example, if the user applies a touch and slide gesture from one point 500 on the display unit 151 to another point 502, the controller 180 may determine that the user selects at least one region of the display unit 151 corresponding to the touch and slide gesture to overlap the semi-transmissive area.

Accordingly, as shown in FIG. 5B, the controller 180 may determine that one region 550 of the display unit 151 corresponding to the touch and slide gesture is selected to overlap the semi-transmissive area. Then, the controller 180 creates the semi-transmissive area corresponding to the size and position of the selected region 550 and determines the color of the semi-transmissive area, and displays image data, i.e., multiple pieces of text, displayed in the region 550 in such a manner as to overlap the semi-transmissive area. Accordingly, the user may display only some of the multiple pieces of text displayed on the display unit 151 that they want in such a manner as to overlap the semi-transmissive area of a predetermined color.

A variety of touch gestures, apart from the touch and slide gesture, which allow the user to select a region containing at least one piece of text or image by themselves may be set. For example, if the user touches a part of the screen displayed on the display unit 151 to lock the screen and applies a gesture (e.g., drag or slide) with other fingers while the screen is locked, the controller 180 may determine that a gesture for selecting a region for outputting the semi-transmissive area has been detected. In this case, the controller 180 may determine that at least one region of the display unit 151 corresponding to the lock and slide gesture has been selected by the user.

The above description has been made taking an example in which at least one region of the display unit is selected to overlap the semi-transmissive area according to a predetermined condition or based on the user's selection. Alternatively, at least one region of the display unit may be selected based on the movement of the user's gaze.

FIGS. 6A, 6B, 6C, 6D, 6E, 6F, and 6G illustrate an example where a display region of the semi-transmissive area is shifted according to the user's selection in the mobile terminal according to the embodiment of the present invention.

For example, the mobile terminal 100 according to the embodiment of the present invention may further include a gaze detector (not shown) for detecting the movement of the user's gaze. Here, the gaze detector (not shown) may be included within the sensing unit 140, or implemented separately from the sensing unit 140.

Using the gaze detector, the controller 180 may recognize the user's gaze and sense the direction where the user's eyes are looking on the display unit 151, that is, the direction of gaze. In this case, if the direction of the user's gaze changes, the controller 180 may detect this change and recognize the direction and speed where the user's gaze moves.

Figure 6A:
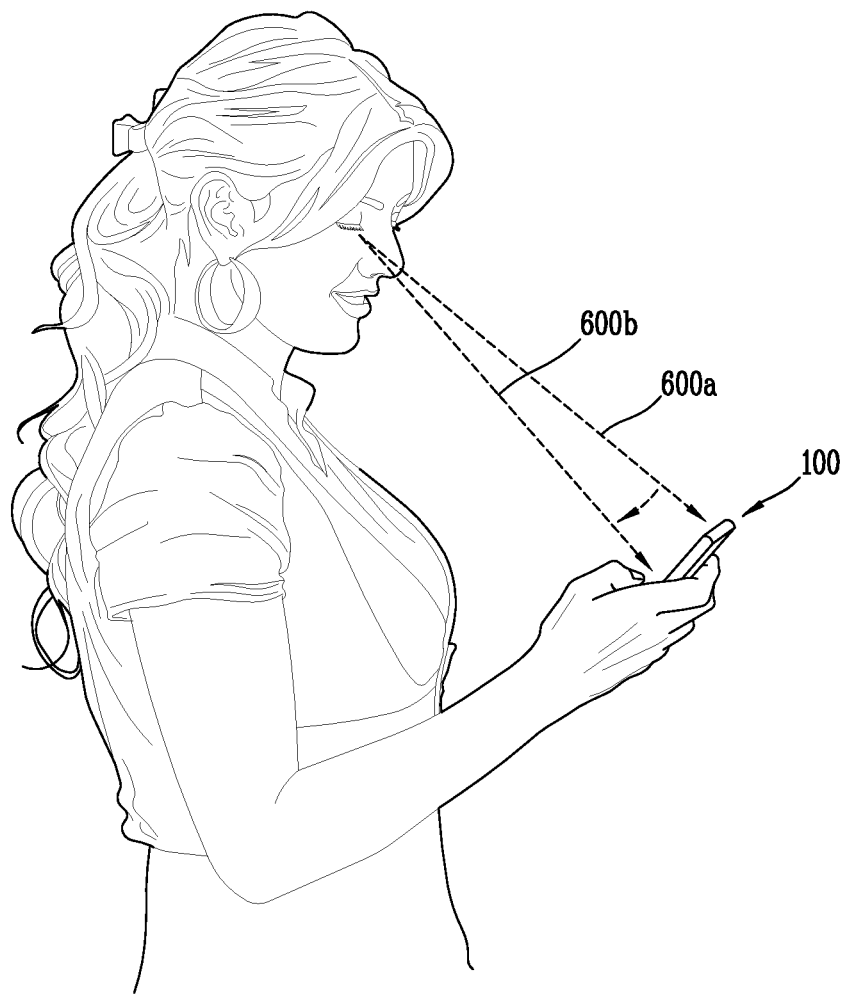
FIGS. 6A, 6B, 6C, 6D, 6E, 6F, and 6G are conceptual diagrams illustrating an example where a display region of the semi-transmissive area is shifted according to the user's selection in the mobile terminal according to the embodiment of the present invention.

Also, if there is a change in the direction of the user's gaze, the controller 180 may change the position of the current selected region based on the direction where the user's gaze moves. For example, as shown in FIG. 6A, if the user's gaze moves from the direction 600a in which the user looks at one point on the mobile terminal 100 to the direction 600b in which the user looks at another point on the mobile terminal 100, the controller 180 may recognize the change in the direction of the user's gaze by using the gaze detector.

Next, the controller 180 may shift at least one current selected region of the display unit 151 based on the change in the direction of the user's gaze.

For example, upon sensing a predetermined touch and slide gesture from the user as mentioned above, the controller 180 may determine that at least one region of the display unit 151 corresponding to the sensed touch and slide gesture is selected to be displayed in such a manner as to overlap the semi-transmissive area. Alternatively, upon recognizing the user's gaze, the controller 180 may estimate a specific point on the display unit 151 the user's eyes are looking at, and determine that a predetermined region around the estimated specific point is selected to be displayed in such a manner as to overlap the semi-transmissive area.

Here, the predetermined region may be determined depending on the type of image data currently displayed on the display unit 151. For example, a specific point on the display unit 151 where the user's eyes are looking is estimated to be an image display region, the controller 180 may determine that the image display region is selected by the user's gaze. Alternatively, if a specific point on the display unit 151 where the user's eyes are looking is estimated as a display region of at least one piece of text, the controller 180 may determine that at least part (e.g., one or two text strings) of the display region of at least one piece of text is selected to overlap by the user's gaze.

Figure 6B:
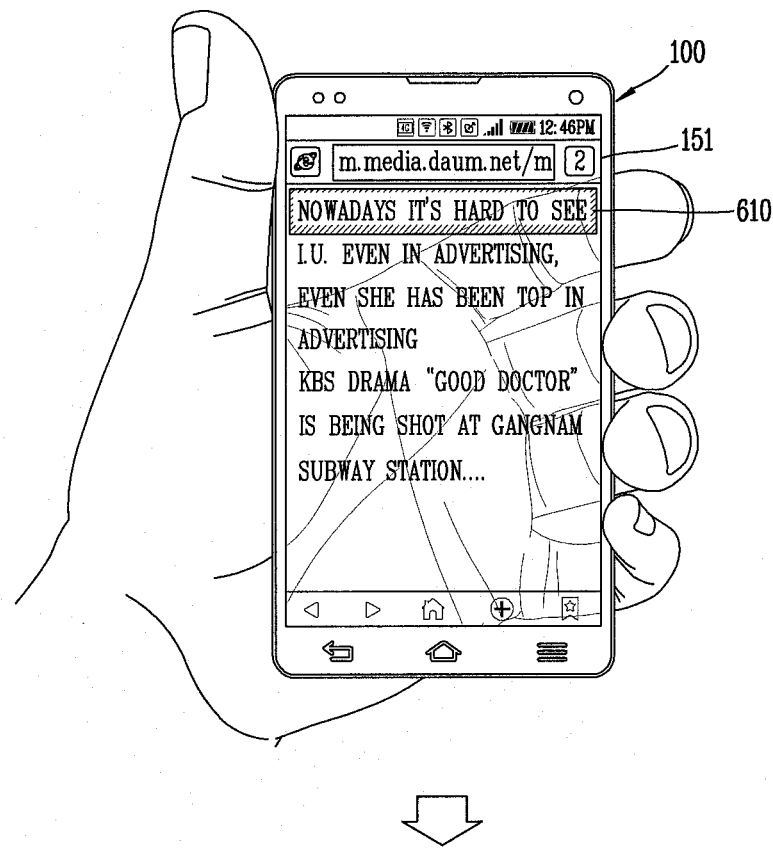
Figure 6B:
Figure 6B:
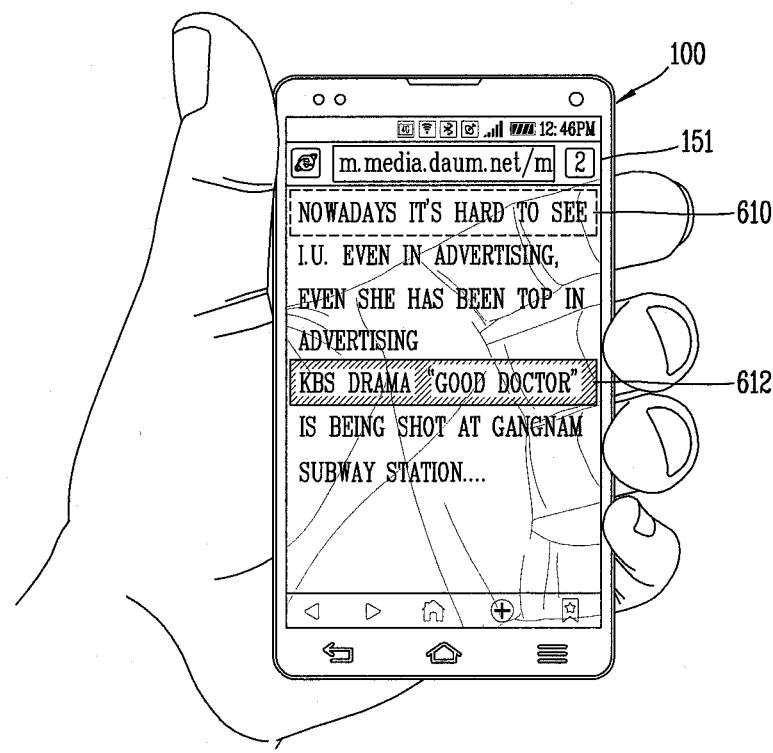

The first drawing of FIG. 6B shows such an example.

Referring to the first drawing of FIG. 6B, as described above, a display region 610 of at least one test string is selected to be displayed in such a manner as to overlap the semi-transmissive area by the user's touch and slide gesture or by the user's gaze.

Hereupon, upon sensing a change in the direction of the user's gaze, the controller 180 may shift the selected region based on the change in the direction of the user's gaze. For example, as shown in FIG. 6A, if the user's gaze moves from 600a to 600b, the controller 180 may select a new region based on the change in the direction of the user's gaze, as shown in the second drawing of FIG. 6B.

That is, if the direction of the user's gaze changes, the controller 180 may detect the direction and speed where the user's gaze moves by using the gaze detector. Also, if the detected amount of movement of the user's gaze is equal to or greater than a predetermined amount, the controller 180 may select another region of the display unit 151 around the current selected region 610 based on the detected speed at which the user's gaze moves.

Accordingly, as shown in FIG. 6A, if the user's gaze moves downward, the controller 180 may select a new region which is positioned below the current selected region 610 according to the movement of the user's gaze. Here, the new region to be selected may be determined depending on the type of image data. For example, if a region of the display unit 151 corresponding to the direction the user's gaze moves is an image display region, the controller 180 may determine that the image display region is selected by the movement of the user's gaze. Alternatively, if a region of the display unit 151 corresponding to the direction the user's gaze moves is presumed to be a display region of at least one piece of text, the controller 180 may determine that at least part (e.g., one or two text strings) of the display region of at least one piece of text is selected to overlap the semi-transmissive area by the user's gaze.

Accordingly, as shown in the second drawing of FIG. 6B, while multiple text strings are displayed on the display unit 151, the controller 180 may select a display region of each text string to overlap the semi-transmissive area. Therefore, if the user's gaze moves, the controller 180 may select display regions of the text strings positioned below the current selected region 610 to be sequentially displayed in such a manner as to overlap the semi-transmissive area.

Accordingly, the controller 180 may sequentially shift a display region of each of the text strings positioned in the direction of movement of the user's gaze to a region that is displayed in such a manner as to overlap the semi-transmissive area. (b) of FIG. 6B shows an example where the display regions are displayed in such a manner as to overlap the semi-transmissive area as the user's gaze moves. Here, the semi-transmissive area 612 may be of a different color from the color of displayed image data, i.e., text or images or the color of the objects positioned on the rear of the mobile terminal.

Meanwhile, the controller 180 may change the color, brightness, or illuminance of text or image displayed in a region selected to overlap the semi-transmissive area as much as the user wants, in order to enhance readability. That is, the controller 180 may display the image data displayed in the selected region in such a manner as to overlap the semi-transmissive area, and at the same time change the brightness or illuminance of the image data based on the detected color or illuminance of the semi-transmissive area.

For example, if the semi-transmissive area is a dark color and even its illuminance is equal to or lower than a predetermined level, the controller 180 may allow the image data displayed in the corresponding region to be displayed in a light color with a certain level of illuminance or higher. On the contrary, if the semi-transmissive area is a light color and even its illuminance is high, the controller 180 may allow the image data displayed in the corresponding region to be displayed in a dark color with an illuminance lower than a predetermined level.

Meanwhile, FIG. 6B has been illustrated by taking an example in which a specific region of the display unit 151 for displaying one text string is selected and shifted based on the movement of the user's gaze. It is to be noted that the size of the specific region of the display unit 151 may be changed as much as the user wants according to the user's selection. For example, the controller 180 may select a region containing one or more text strings or images as much as the user wants based on the user's touch and slide gesture.

Figure 6C:
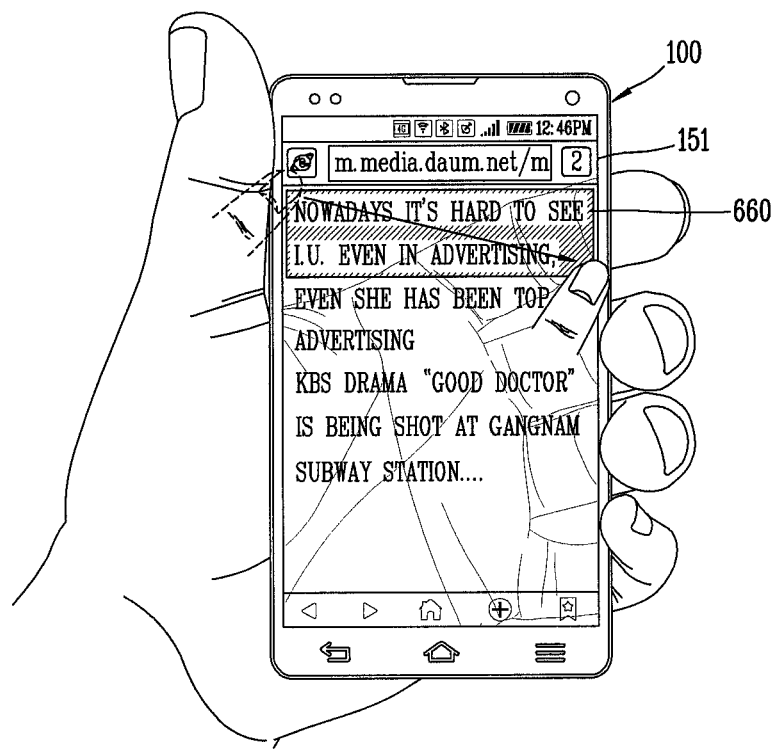

FIG. 6C shows such an example.

For example, as shown in FIG. 6C, the controller 180 may select a certain region 610 of the display unit 151 based on the user's touch and drag input. The selected area 610 may contain at least two text strings or images. In this case, the controller 180 may create a semi-transmissive area corresponding to the size and position of the selected region and display image data in such a manner as to overlap the created semi-transmissive area, and determine the color of the created semi-transmissive area. For example, the controller 10 may determine the color of the semi-transmissive area based on at least either the color of the image data displayed in the selected region 610 or the color of objects positioned on the rear of the mobile terminal 100.

Alternatively, upon sensing a predetermined touch gesture, i.e., touch slide, or the above-mentioned lock and slide gesture on multiple text strings, the controller 180 may determine that a display region of the text strings corresponding to the touch gesture is selected to be displayed in such a manner as to overlap the semi-transmissive area.

If a region of a certain size, rather than a display region of one text string, is selected by the user, the controller 180 may output a semi-transmissive area corresponding to the size and position of the selected region 660 and display the image data displayed in the selected region to be displayed in such a manner as to overlap the semi-transmissive area.

Hereupon, the controller 180 may sense the movement of the user's gaze. That is, as explained in FIG. 6B, upon recognizing the movement of the user's gaze, the controller 180 may shift a display region of the semi-transmissive area based on the movement of the user's gaze. The region to be shifted based on the movement of the user's gaze may be determined based on the region selected by the user as shown in FIG. 6C.

For example, if the user selects a specific region by themselves, the controller 180 may sequentially select an area corresponding to the size of the region selected by the user along the direction the user's gaze moves. Then, the controller 180 may create a semi-transmissive area corresponding to the size of selected region and display image data in such a manner as to overlap the created semi-transmissive area.

Figure 6D:
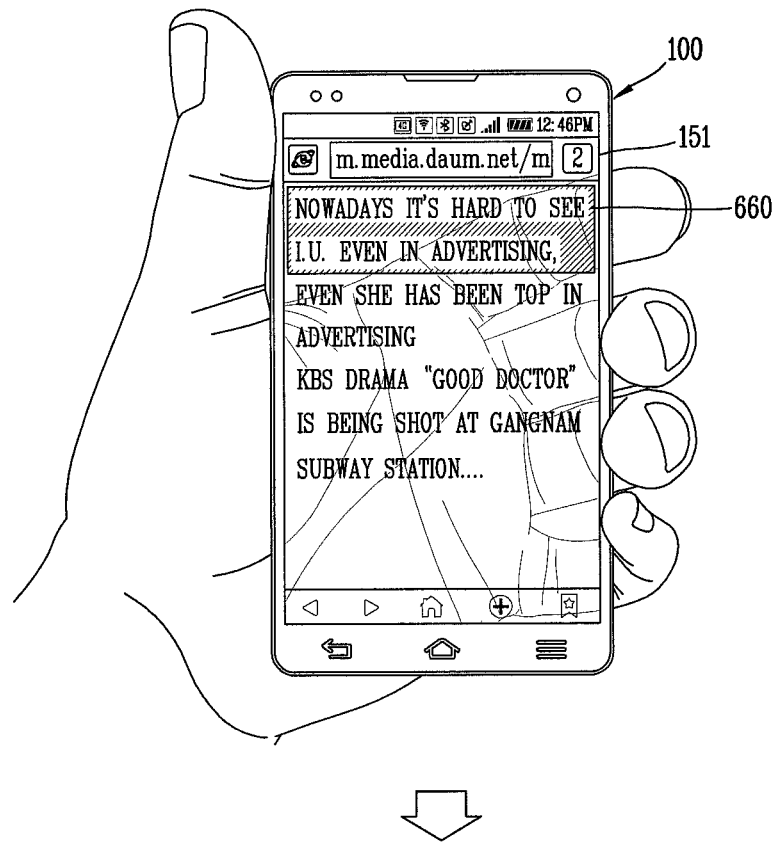
Figure 6D:
Figure 6D:
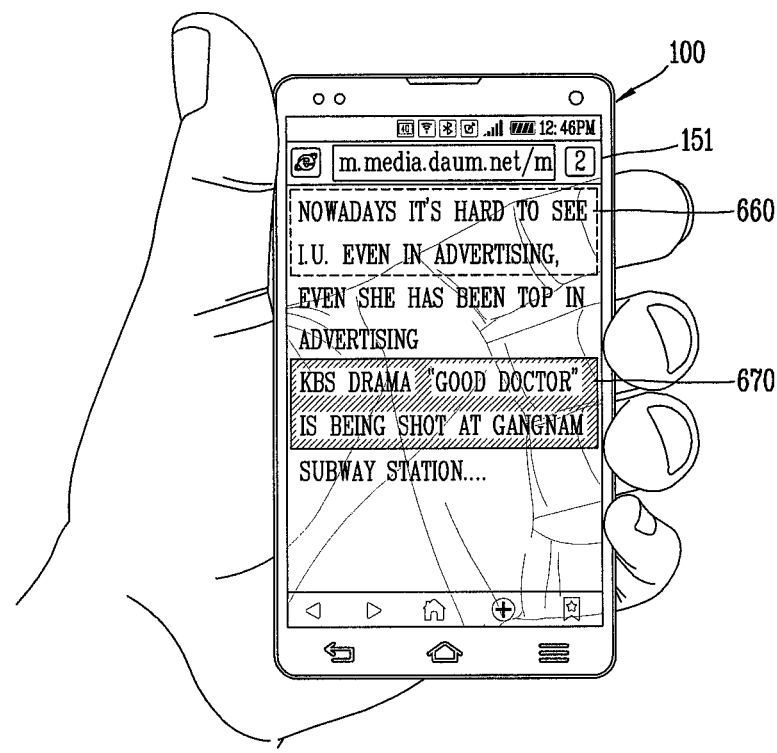

Accordingly, as shown in the first drawing of FIG. 6D, if the region selected by the user is the region 660 containing two text strings, the controller 180 may sequentially select a region of the display unit 151 that displays two text strings based on the movement of the user's gaze. That is, as shown in the first drawing of FIG. 6D, if the region selected by the user is a region of the display unit 151 that displays the first and second text strings, the controller 180 may shift the selected region to a region of the display unit 151 that displays the second and third text strings, based on the movement of the user's gaze. If the user's gaze continues to move, the controller 180 may select a region 670 of the display unit 151 that displays the fifth and sixth text strings, as shown in the second drawing of FIG. 6D.

The above description has been made taking an example in which a region overlapping the semi-transmissive area is shifted to a region displaying other image data as the user's gaze moves. However, it should be noted that the region overlapping the semi-transmissive area may be shifted to other regions in different ways.

For example, if a certain region of the display unit 151 is selected to be displayed in such a manner as to overlap the semi-transmissive area, the controller 180 may shift the selected area based on the user's touch gesture.

Figure 6E:
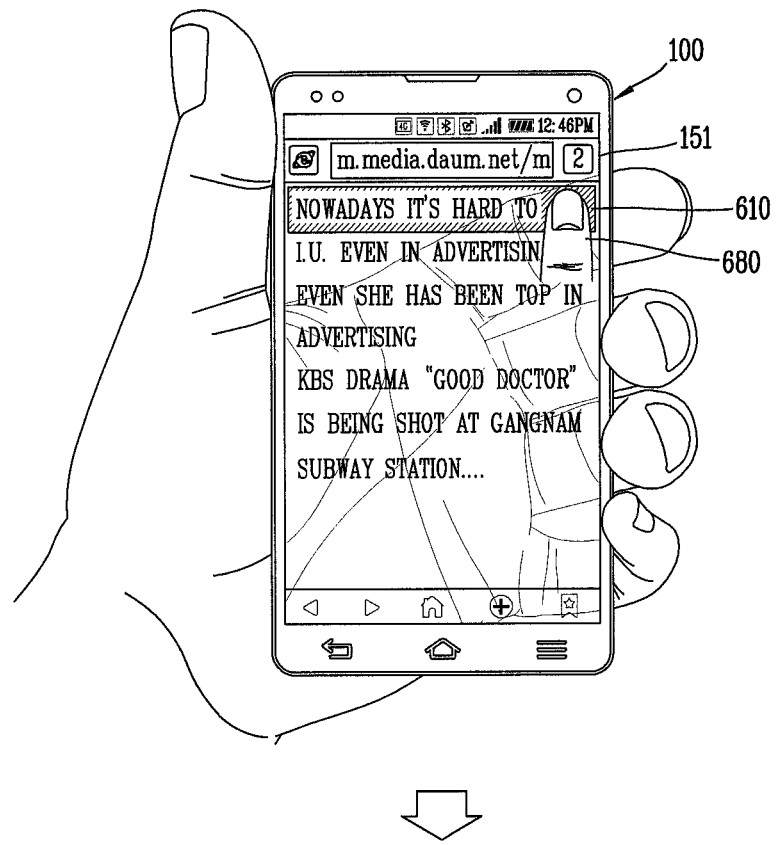
Figure 6E:
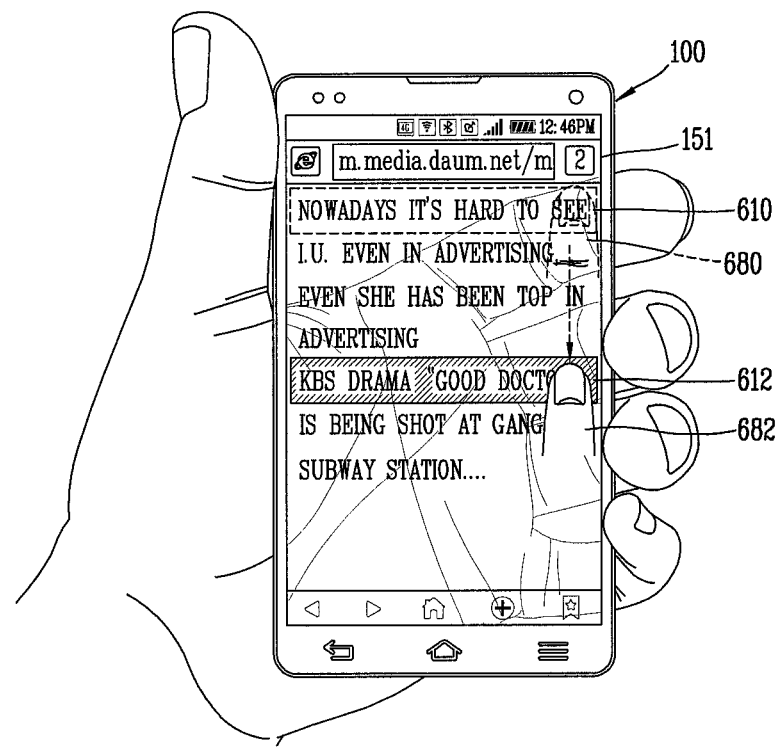

FIG. 6E shows such an example.

Referring to FIG. 6E, if there is a user's touch 680 while a certain region of the display unit 151 is displayed in such a manner as to overlap the semi-transmissive area, the controller 180 may sense this touch. Also, the controller 180 may shift the region displayed in such a manner as to overlap the semi-transmissive area to other regions of the display unit 151 according to the user's selection.

For example, the user's selection may be touch and drag input, That is, as shown in the first drawing of FIG. 6E, if the user applies touch and drag input from the point 680 on the display unit 151 to another point 682 on the display unit 151, the controller 180 may consider it as the user's selection for shifting the region overlapping the semi-transmissive area. Accordingly, the controller 180 may shift the semi-transmissive area to another point 682 on the display unit 151 based on the user's touch and drag input.

Therefore, the controller 180 may display the semi-transmissive area in some region of the display unit 151 corresponding to the point 682 on the display unit 151. Also, the controller 180 may display the image data displayed in the region corresponding to the point 682 on the display unit 151 in such a manner as to overlap the semi-transmissive area. Here, the semi-transmissive area may be shifted depending on the region initially selected by the user. For example, as shown in the second drawing of FIG. 6E, if only one text string is selected, the semi-transmissive area to be shifted based on the touch and drag input is likewise shifted one text string for each time based on the drag input.

On the other hand, if two or more text strings are selected to overlap the semi-transmissive area, the controller 180 may determine the size of the semi-transmissive area to be shifted based on the drag input, according to the size of the current selected region. That is, as shown in 6C, if two text strings are selected to overlap the semi-transmissive area, the controller 180 may shift the semi-transmissive area corresponding to the two text strings based on the drag input.

Moreover, the size of the semi-transmissive area to be shifted based on the drag input may vary depending on the type of image data output at a position corresponding to the semi-transmissive area. For example, if the image data to be output at a position corresponding to the semi-transmissive area is an 'image', the controller 180 may display the semi-transmissive area only in the region of the display unit 151 where the 'image' is output.

It is to be noted that the mobile terminal 100 according to the embodiment of the present invention is capable of adjusting the transparency of the semi-transmissive area according to the user's selection. For example, the mobile terminal 100 according to the embodiment of the present invention may include a menu for adjusting the transparency of the semi-transmissive area, and the user may adjust the transparency of the mobile terminal 100 by themselves through this menu.

In addition, it should be noted that, once a region overlapping the semi-transmissive area is selected by the user, the mobile terminal 100 according to the embodiment of the present invention may adjust the transparency of the semi-transmissive area based on the user's selection.

Figure 6F:
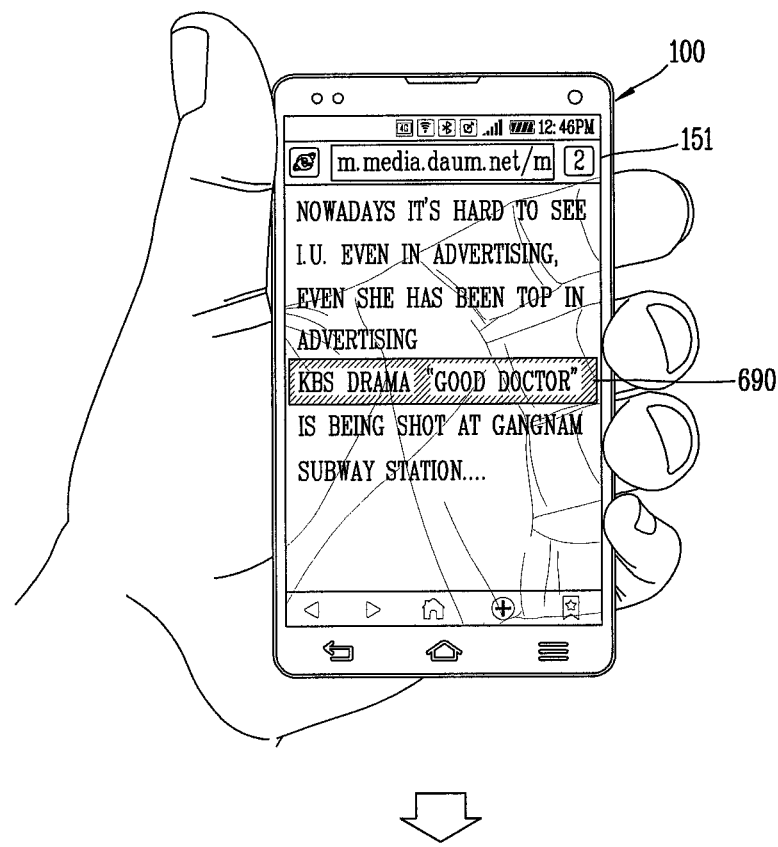
Figure 6F:
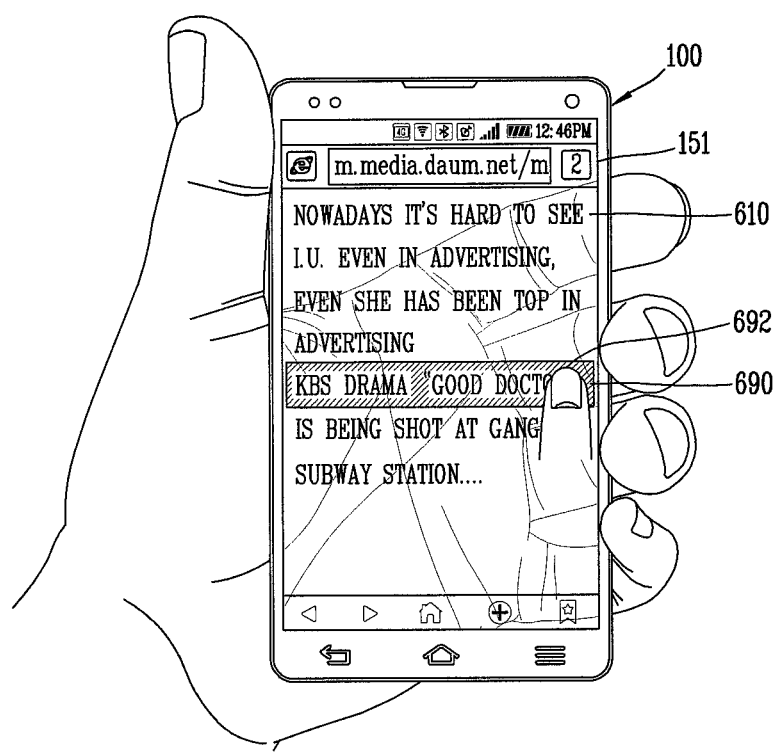
Figure 6G:
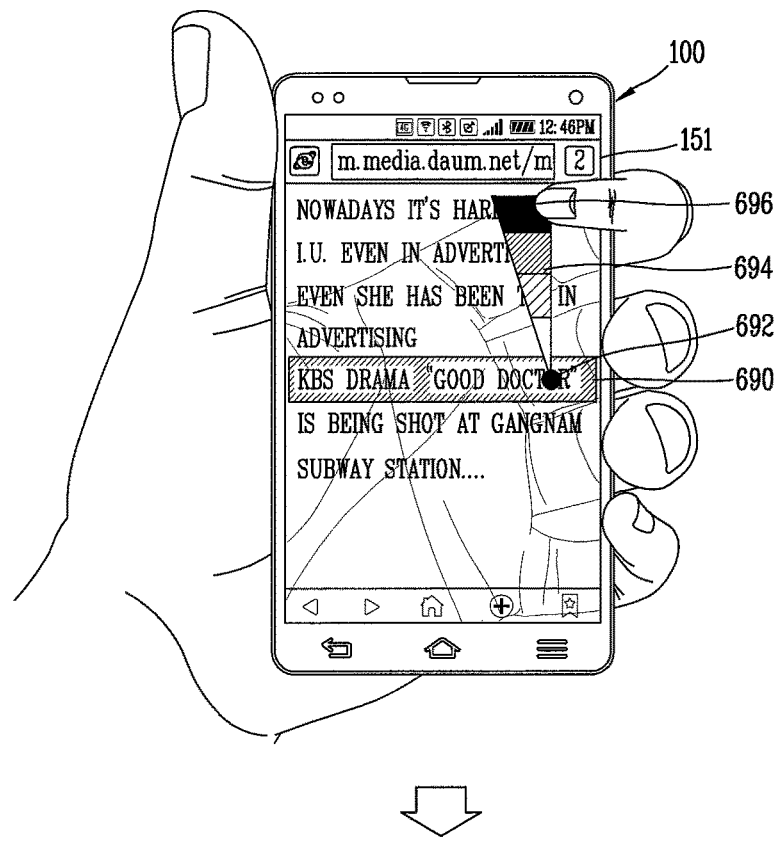
Figure 6G:
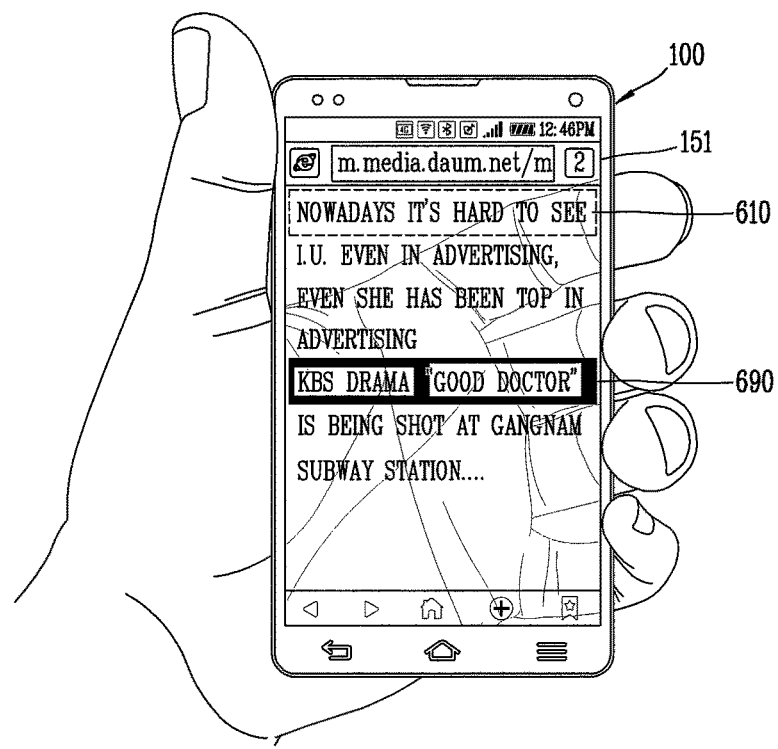

FIGS. 6F and 6G show such an example.

For example, while some region 690 of the display unit 151 is displayed in such a manner as to overlap the semi-transmissive area, as shown in (a) of FIG. 6F, the controller 180 may further sense the user's input for adjusting the transparency of the semi-transmissive area.

The user's input may be touch input from the user that lasts for more than a predetermined length of time. For example, as shown in (b) of FIG. 6F, if the user applies touch input on the region 690 displayed in such a manner as to overlap the semi-transmissive area and holds it for more than a predetermined length of time, the controller 180 may determine that the touch input is the user's input for adjusting the transparency of the semi-transmissive area displayed in the region 690.

Here, the controller 180 may display a menu screen for allowing the user to set the transparency of the semi-transmissive area in at least some region of the display unit 151. The controller 180 may output a menu screen including the menu for transparency adjustment and allow the user to select the transparency adjustment menu and adjust the transparency of the semi-transmissive area. However, if the user's input is considered as input for adjusting the transparency of the semi-transmissive area, the controller 180 may allow the user to select the transparency of the semi-transmissive area through a graphics object displayed on the display unit 151.

The first drawing of FIG. 6G shows such an example.

For example, if the user applies touch input and holds it for more than a predetermined length of time, as shown in the first drawing of FIG. 6F, the controller 180 may display a graphics object 694 associated with the settings of the transparency of the semi-transmissive area in at least some region of the display unit 151, as shown in the second drawing of FIG. 6G. Then, the controller 180 may change the transparency of the semi-transmissive area based on the user's touch input on the graphics object 694 associated with the transparency settings.

For example, the graphics object 694 associated with transparency adjustment may be divided into a plurality of regions as shown in the first drawing of FIG. 6G, and each of the regions may correspond to a different level of transparency. In this case, the user may select any one of the plurality of regions by new touch input or by drag input applied while holding the touch. Also, the controller 180 may adjust the transparency of the semi-transmissive area based on the level of transparency of the selected region.

Accordingly, the transparency of the semi-transmissive area may be adjusted. For example, if the lowest level of transparency is selected by the user's touch or drag input on the graphics object 694 associated with transparency adjustment, the transparency of the semi-transmissive area may be further lowered and the semi-transmissive area becomes more opaque. The second drawing of FIG. 6G shows such an example. On the contrary, if the highest level of transparency is selected, the transparency of the semi-transmissive area may be further improved and the semi-transmissive area becomes more transparent.

It is to be noted that the user may change the color of the semi-transmissive area as they wants in a similar way. In this case, if the user chooses to hold the touch input for more than a predetermined length of time, for example, the controller 180 may display a graphics object having a plurality of regions corresponding to different colors in at least part of the display unit 151. Also, when a certain region is selected based on the user's new touch input or drag input, the controller may set the color of the semi-transmissive area to a color corresponding to the selected region. Moreover, the user may lock this color setting in order to maintain the selected color of the semi-transmissive area.

While FIGS. 6F and 6G illustrate that the graphics object 694 is displayed upward some distance from a specific point on the display unit 151 where the touch input is held (assuming that the microphone 122 is positioned at the bottom edge of the mobile terminal 100, for example), it is to be noted that the graphics object 694 may be displayed in other forms as desired within an allowable range on the display unit 151. For example, the graphics object 694 may be displayed downward, rather than upward, from the point on the display unit 151 where the user's touch input is held, or may be displayed leftward or rightward. It is to be noted that the size of the graphics object 694 also can be changed.

As mentioned above, the color of the semi-transmissive area may be determined according to the color of image data displayed in the current selected region of the display unit 151 or the color of objects positioned on the rear of the mobile terminal 100.

However, if the color of image data displayed in the selected region contrasts with the color of objects positioned on the rear of the mobile terminal 100 transmitted on the display unit 151, it should be noted that it may not be necessary to output a semi-transmissive area corresponding to the size and position of the selected region and display the image data in such a manner as to overlap the output semi-transmissive area.

In this case, the controller 180 of the mobile terminal 100 according to the embodiment of the present invention may compare the color of the image data with the color of the objects positioned on the rear of the mobile terminal 100, and select a specific color for the semi-transmissive area only when the color of the objects huts the readability of the image data.

Figure 7:
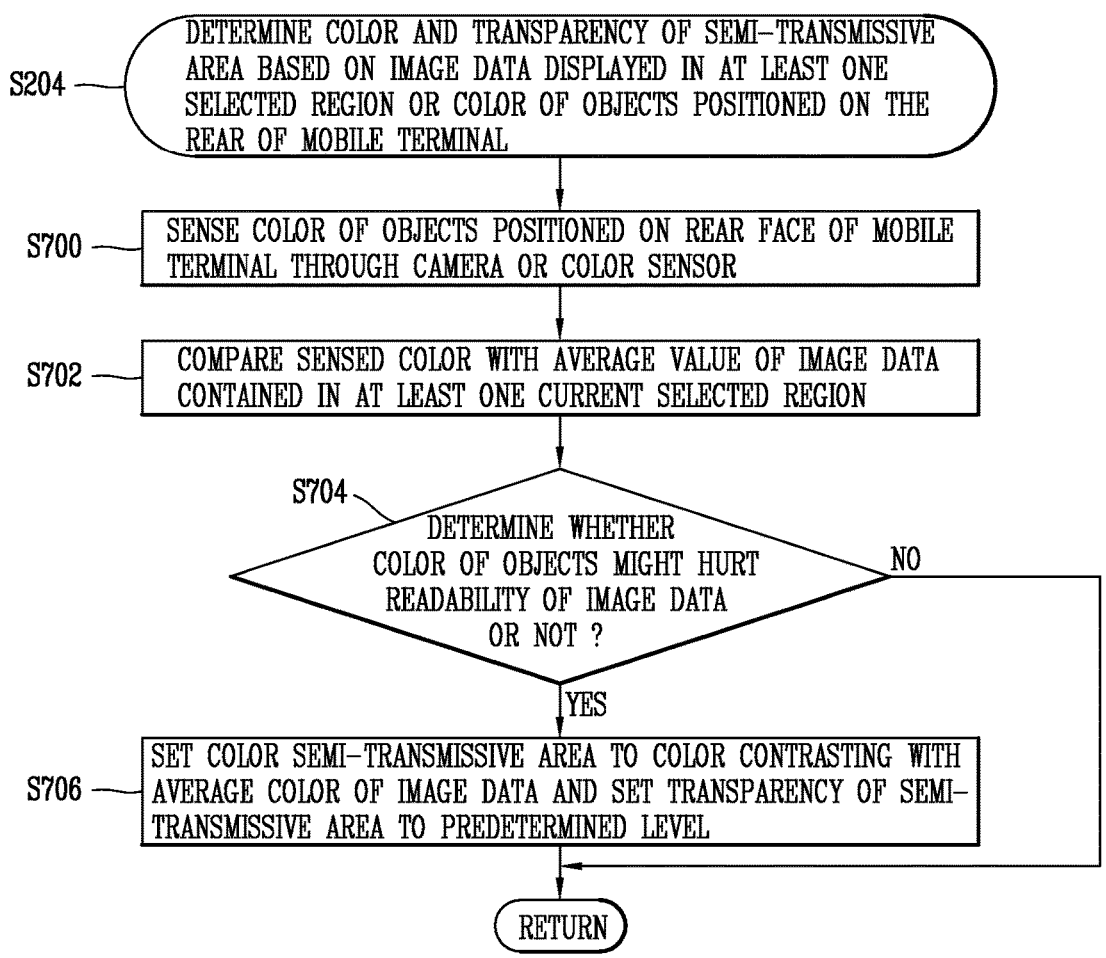
FIG. 7 is a conceptual diagram illustrating the flow of a process for determining the color of the semi-transmissive area in the mobile terminal according to the embodiment of the present invention.

FIG. 7 is a conceptual diagram illustrating the flow of a process for determining the color of the semi-transmissive area in the mobile terminal according to the embodiment of the present invention.

Referring to FIG. 7, in the step S202, when a semi-transmissive area corresponding to the size and position of at least one selected region of the display unit 151 is created, the controller 180 may sense the color of objects positioned on the rear of the mobile terminal 100 by using the camera 121 or a plurality of color sensors 130 (S700). Here, the controller 180 may obtain the average color from the sensed color values of the objects and consider it as the sensed color of the objects. Alternatively, the controller 180 may obtain the average color by averaging the values sensed by the plurality of color sensors 130. Also, the controller 180 may divide the display unit 151 into a plurality of regions based on the number of the color sensors, and sense the objects positioned on the rear of the mobile terminal 100 in different colors for the regions based on the values of the regions sensed by the color sensors.

Once the color of the objects is sensed, the controller compares the currently sensed color with the average value of at least one piece of image data contained in the at least one current selected region (S702). Here, the image data may be text or an image. For example, the controller 180 may calculate the average color of the entire at least one piece of image data by averaging the color values (e.g., RGB values) of the pixels of the at least one piece of image data. Then, the controller 180 compares the calculated average color of the at least one piece of image data with the color of the objects sensed in the step S700. If the display unit 151 is divided into a plurality of regions and the objects positioned on the rear of the mobile terminal 100 are sensed in different colors for the regions, the color of the objects and the average color of the image data may be compared with each other for each region of the display unit 151.

Next, the controller 180 determines whether the color of the objects sensed in the step S700 might hurt the readability of the image data or not (S704). For example, if the difference between the sensed color of the objects and the color value (e.g., RGB values) of the average color of the image data is equal to or less than a predetermined value, the controller 180 may determine that the sensed color of the objects may degrade the readability of the image data. As long as the display unit 151 is divided into a plurality of regions and the color of the objects positioned on the rear of the mobile terminal 100 is sensed in different colors for the plurality of regions, the process of the step S704 may be carried out for each of the plurality of regions.

If the result of determination in the step S704 shows that the readability of the image data may be degraded, the controller 180 may set the color of the semi-transmissive area corresponding to the size and position of at least one selected region of the display unit 151 to a color different from the average color of the image data, more preferably, a color contrasting with the average color (S706). Also, the controller 180 may determine the transparency of the semi-transmissive area. Here, the transparency may be set to a predetermined level, or changed by the user as desired (S706).

The process proceeds to the step S206 to display the image data displayed in the selected region in such a manner as to overlap the semi-transmissive area of the color determined in the step S706.

If the result of determination in the step S704 shows that there is no problem with the readability of the image data, the controller 180 may proceed to the step S206 to display the image data contained in the current selected region in such a manner as to overlap the semi-transmissive area.

This is because the color of the objects does not degrade the readability of the image data even if the color or transparency of the semi-transmissive area has not been determined yet, i.e., images of the objects positioned on the rear of the mobile terminal 100 are being transmitted. Accordingly, the semi-transmissive area crated in the step S202 may remain without a specified color and transparency determined for it, that is, the images of the objects positioned on the rear of the mobile terminal 100 may continue to be transmitted. Also, as long as the display unit 151 is divided into a plurality of regions and the color of the objects positioned on the rear of the mobile terminal 100 is sensed in different colors for the plurality of regions, the processes in the steps S704 and S706 may be carried out for each of the plurality of regions.

If the selected region of the display unit 151 is shifted to another region, the process shown in FIG. 7 may be repeatedly carried out for this region. That is, if at least one currently selected region of the display unit 151 is shifted to another position based on the movement of the user's gaze or the user's selection, as described above, the controller 180 may perform the above-mentioned process, i.e., the process shown in FIGS. 2 and 7, on the region of the display unit 151 selected for the new position. Accordingly, as shown in FIG. 6B or 6E, a semi-transmissive area corresponding to the size and position of the new selected region is created, and image data displayed in the new selected region of the display unit 151 may be displayed in such a manner as to overlap the semi-transmissive area.

It should be noted that the controller 180 of the mobile terminal 100 according to the embodiment of the present invention may change the color of the semi-transmissive area only when there is a significant change in the color of the objects positioned on the rear of the mobile terminal 100. For example, if the mobile terminal 100 is on the floor or in a holder, the controller 180 may keep the current settings of the semi-transmissive area as it is. On the other hand, if the mobile terminal 100 is moved, that is, there is a significant change in the surrounding environment of the mobile terminal 100, the current settings of the semi-transmissive area may be changed, thereby preventing electric power consumption caused by a unnecessary change in the settings of the semi-transmissive area.

Figure 8:
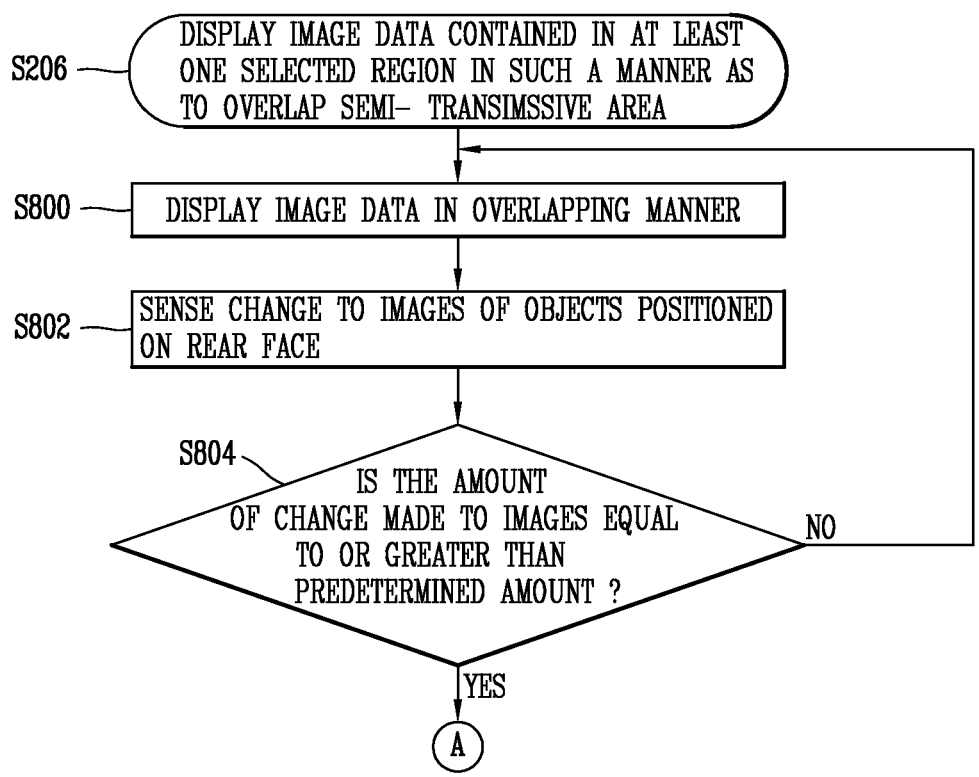
FIG. 8 is a conceptual diagram illustrating the flow of a process for changing the color of the semi-transmissive area based on a change to images of the objects positioned on the rear of the mobile terminal according to the embodiment of the present invention.

FIG. 8 is a conceptual diagram illustrating the flow of a process for changing the color of the semi-transmissive area based on a change to images of the objects positioned on the rear face in the mobile terminal according to the embodiment of the present invention.

For example, when the color and transparency of the semi-transmissive area are determined in the step S204, the controller 180 may display image information in such a manner as to overlap the semi-transmissive area (S800). Then, the controller 180 senses a change to images of the objects positioned on the rear of the mobile terminal 100 (S802).

For example, the controller 180 senses images of the objects positioned on the rear of the mobile terminal 100 at regular time intervals, and measures the amount of change to the images by comparison of the sensed images. Alternatively, the controller 180 may sense images of the objects positioned on the rear of the mobile terminal 100 by an acceleration sensor or inertial sensor each time the mobile terminal 100 is found to have moved to a predetermined distance or more, and measure the amount of change made to the images of the objects by comparing the sensed images with the previous results. Here, the amount of change made to the images may include at least either the amount of change in the shape of the objects positioned on the rear of the mobile terminal 100 or the amount of change in the color of the objects.

Based on the result of sensing in the step S802, the controller 180 may determine if the amount of change made to the images is equal to or greater than a predetermined amount (S804). If the result of determination in the step S804 shows that the amount of change made to the images is less than the predetermined amount, the controller 180 may repeatedly perform the processes of the steps S800 to S804.

On the other hand, if the result of determination in the step S804 shows that the amount of change made to the images is equal to or greater than the predetermined amount, the controller 180 may proceed again to the step S204. Then, the controller 180 may determine the current color and transparency of the semi-transmissive area again in the step S204. It should be noted that, as stated in FIG. 7, the controller 180 may determine the color of the semi-transmissive area again only when the current color of the objects positioned on the rear of the mobile terminal might hurt the readability of the image data.

While the foregoing description has been made taking an example in which the semi-transmissive area is output based on the color of image data displayed in a specific region of the display unit 151 and the image data overlaps the semi-transmissive area, the semi-transmissive area may be output based on the type of image data output on the display unit 151.

For example, if image data output on the display unit 151 is a popup window, the controller 180 may create a semi-transmissive area corresponding to the size and position of the popup window and display the image data contained in the popup window in such a manner as to overlap the created semi-transmissive area. Here, the color of the semi-transmissive area may be determined based on the color of the image data contained in the popup window.

If at least part of a display region of another semi-transmissive area already overlaps a display region of the popup window, the color of the semi-transmissive area may be determined taking into account the color of the overlapping semi-transmissive area. This is because, if another semi-transmissive area is displayed because of the popup window while one semi-transmissive area having a specific color is already displayed, the colors of the semi-transmissive areas may overlap each other and this will confuse the user. Accordingly, while another semi-transmissive area is already displayed in at least part of the display region of the popup window, the controller 180 may display the semi-transmissive area for the popup window in a different color from another semi-transmissive area.

The present invention can be implemented as a computer-readable code on a medium where a program is recorded. The computer-readable medium includes all types of recording medium storing data readable by a computer system. For example, the computer readable medium includes ROMs, RAMs, CD-ROMs, magnetic tapes, floppy disks, optical data storage media, and carrier waves (e.g., transmissions over the Internet). Also, the computer may include the controller 180 of the terminal.

The advantages of a mobile terminal and a control method for the same according to the present invention will be described below.

According to at least one of the embodiments of the present invention, the present invention has the advantage of preventing degradation of the readability of image data displayed on the display unit due to the transmission of images of objects positioned on the rear of the mobile terminal by using a semi-transmissive area of a predetermined color.

According to at least one of the embodiments of the present invention, the present invention has the advantage of improving the readability of image data displayed on the display unit by making the image data overlap a semi-transmissive area of a predetermined color.

According to at least one of the embodiments of the present invention, the present invention has the advantage of saving power consumption by limiting the transparency of only some region of the display unit rather than of the entire region.

According to at least one of the embodiments of the present invention, the present invention has the advantage of enabling the user to find a part the user wants more easily by limiting the transparency of only some region of the display unit.

It is to be understood that the advantages that can be obtained by the present invention are not limited to the aforementioned advantages and other advantages which are not mentioned will be apparent from the following description to the person with an ordinary skill in the art to which the present invention pertains.

It will be apparent to those skilled in the art that the present invention can be embodied in other specific forms without departing from the spirit and essential characteristics of the invention.

For instance, while the above-described embodiments of the present invention have been made by taking an example in which the position of a display region of a semi-transmissive area is shifted based on the movement of the user's gaze, the position of the display region of the semi-transmissive area may be shifted in different ways.

In an example, after one region of the display unit 151 is selected, the controller 180 may select another region of the display unit 151 displaying another image data depending on whether a predetermined period of time has elapsed or not, and display the image data displayed in the selected region in such a manner as to overlap a predetermined semi-transmissive area. That is, the controller 180 may select a display region of another text string (positioned below the text string displayed in the current selected region of the display unit 151) depending on whether a predetermined period of time has elapsed or not. Also, the controller 180 may create a semi-transmissive area for the new selected region, and display the text string displayed in the new selected region in such a manner as to overlap the semi-transmissive area.

While the above description has been made taking an example in which the color and transparency of a semi-transmissive area is determined if the readability of image data might be degraded, the transparent display function can be turned off by the user's selection. For example, if it is difficult to see image data due to objects positioned on the rear of the mobile terminal, the user may turn off the transparent display function. Alternatively, the transparent display function can be turned on/off for each of a plurality of regions divided from a display unit to provide a similar effect or the same effect as the present invention.

It will be apparent to those skilled in the art that such an alternative embodiment, like the present invention, does not depart from the spirit and essential characteristics of the invention because the transparency of some region of the display unit is limited.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a body;
   a transparent display on a front surface of the body, and the transparent display to display at least an image of an object at a rear of the body;
   a plurality of sensors formed at different positions on a back surface of the body, and each of the sensors is configured to sense a color of an object positioned at a rear of the body; and
   a controller to control the transparent display, and in response to selection of at least one region of the transparent display, the controller to control the transparent display to display image data in the region that overlaps a semi-transmissive area corresponding to the selected region of the transparent display,
   wherein the controller to divide the transparent display into a plurality of regions based on each of the positions of the plurality of sensors, and to determine a color of the semi-transmissive area using values of the sensors corresponding to the respective regions.

2. The mobile terminal of claim 1, wherein the controller selects the at least one region based on a size or resolution of text or image in the image data displayed on the transparent display.

3. The mobile terminal of claim 1, wherein the controller selects the at least one region based on a user's touch and slide gesture on the transparent display.

4. The mobile terminal of claim 1, further comprising a gaze detector to detect the user's gaze, and the controller selects the at least one region based on the detected user's gaze.

5. The mobile terminal of claim 4, wherein the gaze detector to sense movement of the user's gaze, and
   in response to movement of the user's gaze, the controller controls the transparent display to display the image data in a region other than the selected region that overlaps the semi-transmissive area.

6. The mobile terminal of claim 1, wherein in response to a user's touch and drag input, the controller controls the transparent display to display the image data in a region other than the selected region that overlaps the semi-transmissive area.

7. The mobile terminal of claim 1, wherein the controller sets a color of the semi-transmissive area to a color that contrasts a color of at least one of text and images in the image data displayed in the region of the transparent display.

8. The mobile terminal of claim 1, further comprising a camera or at least one color sensor to sense color on the rear of the body, and
   the controller to sense images of at least one object on the rear of the body multiple times according to a predetermined condition, the controller to compare the detected images of the objects, and when an amount of change to the images is equal to or greater than a prescribed amount, the controller to change at least one of the color and transparency of the semi-transmissive area.

9. The mobile terminal of claim 1, wherein the controller displays a graphics object associated with adjustment of transparency of the semi-transmissive area in a region of the transparent display based on a user's selection, and the controller determines the transparency of the semi-transmissive area based on the user's input at the displayed graphics object.

10. A mobile terminal comprising:
    a body;
    a camera to capture images of objects at a rear of the body;
    a display at a front of the body to display image data on a background of an image captured by the camera;
    a plurality of sensors formed at different positions on a back surface of the body, and each of the sensors is configured to sense a color of an object positioned at a rear of the body; and
    a controller to control the display, wherein in response to selection of at least one region of the display, the controller to control the display to display image data in a region that overlaps a semi-transmissive area corresponding to the selected one region of the display,
    wherein the controller to divide the display into a plurality of regions based on each of the positions of the plurality of sensors, and to determine a color of the semi-transmissive area using values of the sensors corresponding to the respective regions.

11. The mobile terminal of claim 10, wherein the controller selects at least one region based on a size or resolution of text or image of the image data displayed on the display.

12. The mobile terminal of claim 10, wherein the controller selects the at least one region based on a user's touch and slide gesture on the display.

13. The mobile terminal of claim 10, further comprising a gaze detector to detect a user's gaze, and the controller to select at least one region based on the detected user's gaze.

14. The mobile terminal of claim 13, wherein the gaze detector to sense movement of the user's gaze, and
    in response to movement of the user's gaze, the controller controls the display to display the image data in a region other than the selected region that overlaps the semi-transmissive area.

15. The mobile terminal of claim 10, wherein in response to a user's touch and drag input, the controller controls the display to display the image data in a region other than the selected region that overlaps the semi-transmissive area.

16. The mobile terminal of claim 10, wherein the controller sets a color of the semi-transmissive area to a color that contrasts a color of at least one of text and images of the image data displayed in the region of the display.

17. The mobile terminal of claim 10, further comprising a camera or at least one color sensor to sense color at the rear of the body, and the controller to sense images of at least one object at the rear of the body multiple times according to a predetermined condition, the controller to compare the detected images of the objects, and when an amount of change to the images is equal to or greater than a prescribed amount, the controller to change at least one of the color and transparency of the semi-transmissive area.

18. The mobile terminal of claim 10, wherein the controller displays a graphics object associated with changes in color of the semi-transmissive area in at least a region of the display based on the user's selection, and the controller determines transparency of the semi-transmissive area based on the user's input at the displayed graphics object.

\* \* \* \* \*